US012082215B2

(12) United States Patent
Zaks et al.

(10) Patent No.: US 12,082,215 B2
(45) Date of Patent: *Sep. 3, 2024

(54) APPARATUSES, DEVICES AND METHODS FOR A WIRELESS NETWORK ACCESS DEVICE, A NETWORK GATEWAY DEVICE, A WIRELESS COMMUNICATION DEVICE AND FOR A NETWORK DEVICE

(71) Applicant: Intel Corporation, Santa Clara, CA (US)

(72) Inventors: Artur Zaks, Modiin (IL); Barak Hermesh, Pardes Hana (IL); Yaron Alpert, Hod Hasharon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,186

(22) Filed: Oct. 10, 2022

(65) Prior Publication Data

US 2023/0138249 A1 May 4, 2023

Related U.S. Application Data

(63) Continuation of application No. 16/021,247, filed on Jun. 28, 2018, now Pat. No. 11,470,634.

(Continued)

(51) Int. Cl.
*H04W 72/23* (2023.01)
*H04W 8/04* (2009.01)
(Continued)

(52) U.S. Cl.
CPC ......... *H04W 72/23* (2023.01); *H04W 56/001* (2013.01); *H04W 72/21* (2023.01);
(Continued)

(58) Field of Classification Search
None
See application file for complete search history.

(56) References Cited

U.S. PATENT DOCUMENTS

2011/0269393 A1* 11/2011 Ostergaard ............. H04B 7/155
455/7
2014/0335877 A1* 11/2014 Roberts ................. H04W 72/52
455/560

(Continued)

*Primary Examiner* — Faruk Hamza
*Assistant Examiner* — Cassandra L Decker
(74) *Attorney, Agent, or Firm* — 2SPL Patent Attorneys PartG mbB; Kieran O'Leary

(57) ABSTRACT

An apparatus for a wireless network access device includes a first communication interface for wirelessly communicating with a wireless communication device. The apparatus includes a second communication interface for communicating with a network gateway device. The apparatus includes a control module configured to receive a first request for wireless uplink resources from the wireless communication device via the first communication interface. The control module is configured to provide a second request for wired uplink resources to the gateway device via the second communication interface based on the first request for wireless uplink resources. The second request for wired uplink resources is related to uplink resources of a wired uplink channel of the gateway device.

19 Claims, 13 Drawing Sheets

Related U.S. Application Data

(60) Provisional application No. 62/618,652, filed on Jan. 18, 2018.

(51) Int. Cl.
| | |
|---|---|
| *H04W 28/02* | (2009.01) |
| *H04W 28/10* | (2009.01) |
| *H04W 56/00* | (2009.01) |
| *H04W 72/21* | (2023.01) |
| *H04W 72/52* | (2023.01) |
| *H04W 88/08* | (2009.01) |
| *H04W 88/16* | (2009.01) |
| *H04W 88/18* | (2009.01) |

(52) U.S. Cl.
CPC ............ *H04W 72/52* (2023.01); *H04W 8/04* (2013.01); *H04W 28/0268* (2013.01); *H04W 28/10* (2013.01); *H04W 88/08* (2013.01); *H04W 88/16* (2013.01); *H04W 88/18* (2013.01)

(56) References Cited

U.S. PATENT DOCUMENTS

| | | | |
|---|---|---|---|
| 2017/0105205 A1* | 4/2017 | Lu | H04W 72/21 |
| 2017/0265106 A1* | 9/2017 | Andreoli-Fang | H04W 72/542 |
| 2018/0146410 A1* | 5/2018 | Cho | H04W 72/23 |
| 2019/0297535 A1* | 9/2019 | Andreoli-Fang | H04W 72/542 |

* cited by examiner

APPARATUSES, DEVICES AND METHODS FOR A WIRELESS NETWORK ACCESS DEVICE, A NETWORK GATEWAY DEVICE, A WIRELESS COMMUNICATION DEVICE AND FOR A NETWORK DEVICE

CROSS-REFERENCE TO RELATED APPLICATION

This application is a continuation of U.S. patent application Ser. No. 16/021,247 filed on Jun. 28, 2018. That application claimed priority to U.S. Provisional Patent Application 62/618,652 filed on Jan. 18, 2018. The contents of these earlier filed applications are incorporated by reference herein in their entirety.

FIELD

Examples relate to apparatuses, devices and methods for a wireless network access device, a network gateway device, a wireless communication device and for a network device, a wireless network access device, a network gateway device, a wireless communication device, more specifically, but not exclusively, to providing a request for wired uplink resources based on a request for wireless uplink resources.

BACKGROUND

Modern services like live Virtual Reality/Artificial Reality (VR/AR) may require a low latency for a communication between a device and the internet. If the communication is based on a shared medium, e.g. using a wireless transmission and/or using a coaxial cable system shared among a plurality of users, transmissions via the shared medium may be scheduled. For examples, a central agency, e.g. an access point or a cable modem termination service may decide a frequency, time, code or spatial resource devices may use to make transmission on the shared medium.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
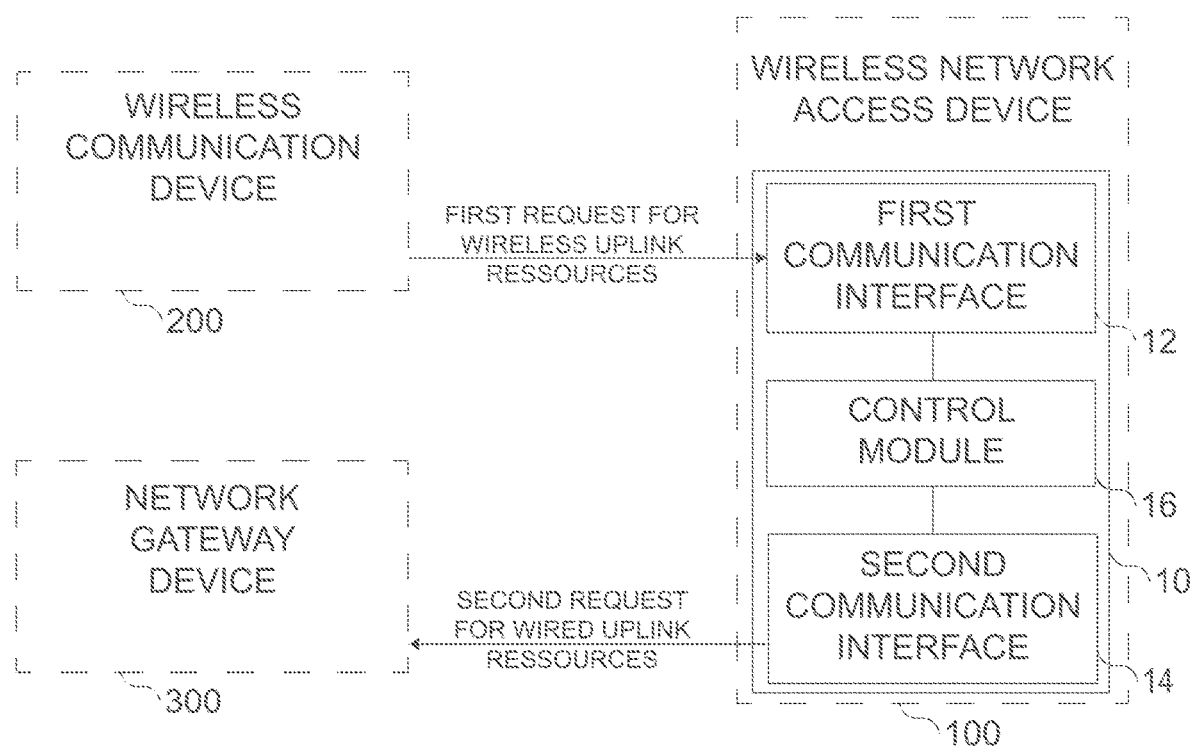
FIG. 1a illustrates a block diagram of an example of an apparatus or a device for a wireless network access device.

FIG. 1a illustrates a block diagram of an example of an apparatus 10 or a device 10 for a wireless network access device 100. The described apparatus 10 corresponds to a device 10. The components of the device 10 are defined as component means which correspond to the respective structural components of the apparatus 10. FIG. 1a further shows the wireless network access device 100 comprising the apparatus 10 or the device 10.

The apparatus 10 comprises a first communication interface 12 for wirelessly communicating with a wireless communication device 200. The first communication interface 12 of the apparatus 10 corresponds to a first means for communicating 12 of the device 10. The apparatus 10 further comprises a second communication interface 14 for communicating with a network gateway device 300. The second communication interface 14 of the apparatus 10 corresponds to a second means for communicating of the device 10. The apparatus 10 further comprises a control module 16. The control module 16 of the apparatus 10 corresponds to a means for controlling 16 of the device 10. The control module 16 is configured to receive a first request for wireless uplink resources from the wireless communication device 200 via the first communication interface 12. The control module 16 is configured to provide a second request for wired uplink resources to the gateway device 300 via the second communication interface 14 based on the first request for wireless uplink resources. The second request for wired uplink resources is related to uplink resources of a wired uplink channel of the gateway device 300. Providing a second request for wired uplink resources based on a first request for wireless uplink resources may enable decreasing a delay caused by scheduling uplink transmission on the wireless and wired networks.

Figure 1B:
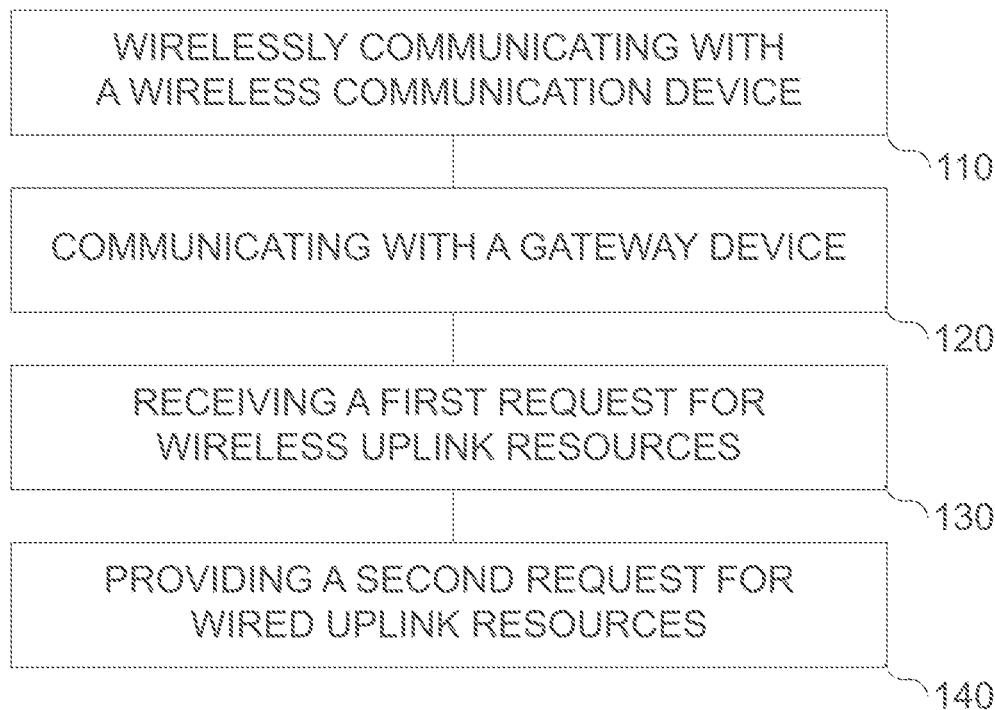
FIG. 1b illustrates a flow chart of an example of a method for a wireless network access device.

FIG. 1b illustrates a flow chart of an example of a corresponding method for the wireless network access device 100. The method comprises wirelessly communicating 110 with a wireless communication device 200 using a first communication interface. The method further comprises communicating 120 with a network gateway device 300 using a second communication interface. The method further comprises receiving 130 a first request for wireless uplink resources from the wireless communication device 200. The method further comprises providing 140 a second request for wired uplink resources to the gateway device 300 based on the first request for wireless uplink resources. The second request for wired uplink resources is related to uplink resources of a wired uplink channel of the gateway device 300.

The following description relates to both the apparatus 10/device 10 and the wireless network access device 100 and to the method for the wireless network access device.

In at least some examples, the wireless network access device 100 is a wireless access point of a wireless local area network. The wireless network access device 100 may be a wireless access point component of a combined wireless network gateway, e.g. a wireless access point of a home router, e.g. of a home cable router. Alternatively, the wireless network access device 100 may be a wireless repeater in a 2-box solution (e.g. the wireless network access device 100 and the network gateway 300 being separate devices).

The first communication interface 12 may correspond to one or more inputs and/or outputs for receiving and/or transmitting information, which may be in digital (bit) values according to a specified code, within a module, between modules or between modules of different entities. The first communication interface 12 may be a first wireless communication interface. The first communication interface 12 may be configured to communicate wirelessly with the wireless communication device, e.g. via a wireless local area network (WLAN). For example, the first communication interface 12 may be configured to communicate using or based on an Institute of Electrical and Electronics Engineers (IEEE) standard 802.11ax. The first communication interface 12 may be configured to wirelessly communicate with the wireless communication device 200 using a Wireless Local Area Network. In at least some examples, the first communication interface 12 is configured to wirelessly communicate with the wireless communication device 200 using a wireless communication channel In at least some examples, the wireless communication device 200 may be a device configured to wirelessly communicate with the wireless network access device 100. The wireless communication device 200 may be a mobile device, e.g. a smartphone, a tablet computer, a mobile computer, a laptop, a programmable watch, a device of the internet of things or a mobile sensor. Alternatively, the wireless communication device 200 may be a stationary device, e.g. a stationary personal computer, a gaming console, a personal video recorder, a set-top box, a wireless speaker or a stationary sensor device, e.g. a security camera.

The second communication interface 14 may correspond to one or more inputs and/or outputs for receiving and/or transmitting information, which may be in digital (bit) values according to a specified code, within a module, between modules or between modules of different entities. The second communication interface 14 may be configured to communicate with the network gateway device 300 using a wired or wireless communication channel. For example, the second communication interface 14 may be configured to communicate with the network gateway device using a wired communication channel, e.g. an Ethernet connection, a Peripheral Control Interface Express interface, an Universal Serial Bus interface, via signal traces on a Printed Circuit Board or within the same chip or chip package. In some examples, the wireless network access device 100 and the network gateway device 300 may be comprised in the same device, e.g. within a wireless network gateway.

In various examples, the network gateway device 300 is a cable modem, e.g. a network gateway configured to communicate via a coaxial cable. For example, the network gateway device 300 may be a cable router, e.g. a home cable router. The network gateway device 300 may be configured to communicate via a scheduled medium, e.g. via a coaxial cable, in which frequency and/or time resources for transmitting via the wired uplink and/or the wired downlink are determined by a third entity, e.g. the network entity 400. For example, the wired uplink channel and/or the wired downlink channel of the network gateway device 300 may be a wired uplink channel and/or a wired downlink channel on a shared medium. For example, the shared medium may be based on a Data Over Cable Service Interface Specification (DOCSIS). The wired uplink channel and/or the wired downlink channel may be based on a Data Over Cable Service Interface Specification.

In various examples, the control module 16 may be implemented using one or more processing units, one or more processing devices, any means for processing, such as a processor, a computer or a programmable hardware component being operable with accordingly adapted software. In other words, the described function of the control module 16 may as well be implemented in software, which is then executed on one or more programmable hardware components. Such hardware components may comprise a general purpose processor, a Digital Signal Processor (DSP), a micro-controller, etc.

In at least some examples, the control module 16 may be configured to control a scheduling of the wireless communication of the first communication interface 12, e.g. to control a scheduling of a wireless uplink channel of the wireless communication device 200 to the wireless network access device 100. The control module 16 is configured to receive a first request for wireless uplink resources from the wireless communication device 200 via the first communication interface 12. The control module 16 may be configured to control a scheduling of a wireless uplink channel of the wireless communication device 200 to the wireless network access device 100 based on the first request for wireless uplink resources (on the wireless uplink channel).

The first request for wireless uplink resources may be received (by the wireless network access device 100) as control information on a data link layer of the wireless communication channel. The first request for wireless uplink resources may indicate, that the wireless communication device 200 requests a low latency service. The uplink data may be based on the low latency service. Using the control information may enable the control module to treat the first request for wireless uplink resources differently to other requests for wireless uplink resources. For example, the first request for wireless uplink resources may indicate, that wired uplink resources are to be requested, e.g. via a traffic identifier. In various examples, the first request for wireless uplink resources may comprise a traffic identifier (e.g. on the data link layer). The control module 16 may be configured to transmit the second request for wired uplink resources (only) if the traffic identifier is set to one of one or more pre-defined values. For examples, the first request for wireless uplink resources might be identified by the control module 16 based on the traffic identifier: If the traffic identifier is set to the one of the one or more pre-defined values, the second request for wired uplink resources may be provided, if not, then not. This may enable an efficient processing of the first request for wireless uplink resources, e.g. using hardware circuitry of the wireless network access device 100. For example, the first request for wireless uplink resources may be part of a data link protocol of the wireless communication channel, e.g. not on the application layer of the wireless communication channel.

In at least some examples, the first request for wireless uplink resources may be a request for wireless uplink resources of the IEEE 802.11ax protocol. The first request for wireless uplink resources may indicate a desire of the wireless communication device 200 to be assigned one or more of a frequency resource, a time resource, a code resource and a spatial resource (e.g. by the wireless network access device 100) to transmit uplink data via the wireless network access device 100 and the wired uplink channel. The wireless uplink resources may be wireless uplink resources on a wireless channel between the wireless communication device 200 and the wireless network access device 100. In at least some examples, the wireless network access device 100 (e.g. the control module 16) is configured to provide wireless communication for a plurality of wireless communication devices. For examples, the wireless network access device 100 may be configured to provide the wireless communication for the wireless communication device 200. The control module 16 may be configured to control, assign and/or grant the wireless uplink resources on the wireless channel, e.g. based on the first request for wireless uplink resources.

The control module 16 may be configured to determine the second request for wired uplink resources based on the first request for wireless uplink resources. The second request for wired uplink resources may indicate a pending transmission of uplink data (of the wireless communication device 200) via the wired uplink channel, for which wired uplink resources are to be reserved. The second request for wired uplink resources is related to uplink resources of a wired uplink channel of the gateway device 300. The wired uplink resources may be one or more elements of the group of a frequency resource on the wired uplink channel, a time resource on the wired uplink channel and a code resource on the wired uplink channel.

The second request for wired uplink channel is based on the first request for wireless uplink channel. The control module 16 may be configured to translate the first request for wireless uplink resources into the second request for wired uplink resources.

For example, a desired Quality of Service (QoS) of the second request for wired uplink resources may be based on a desired Quality of Service of the first request for wireless uplink resources. The first request for wireless uplink resources may comprise information related to a desired quality of service for a transmission of uplink data via the wired uplink channel of the gateway device 300. The control module 16 may be configured to translate the information related to a desired quality of service for the second request for wired uplink resources.

In various examples, a (estimated) size of the second request for wired uplink resources may be based on a (estimated) size of the first request for wireless uplink resources. The first request for wireless uplink resources may comprise information related to an estimated size of the uplink data. The control module 16 may be configured to provide the second request for wired uplink resources based on the information related to the estimated size of the uplink data. This may enable requesting an adequate amount of wired uplink resources. For example, a desired timing of the second request for wired uplink resources may be based on a desired timing of the first request for wireless uplink resources.

The control module 16 may be configured to grant the first request for wireless uplink resources based on the second request for wired uplink resources. For example, the control module 16 may be configured to coordinate a grant of the first request for wireless uplink resources with the second request for wired uplink resources. The control module 16 is configure to provide (e.g. transmit) the second request for wired uplink resources to the network gateway device 300.

In at least some examples, the control module 16 is configured to provide information related to a grant of the requested wireless uplink resources to the wireless communication device 200. The control module 16 may be configured to determine the information related to the grant based on the first request for wireless uplink resources. The control module 16 may be configured to provide the second request for wired uplink resources to the gateway device 300 before providing the information related to the grant of the requested wireless uplink resources to the wireless communication device 200. This may enable reducing a delay caused by the scheduling mechanisms. For example, the information related to the grant of the requested wireless uplink resources may comprise information related to one or more elements of the group of a granted frequency resource, a granted time resource, a granted code resource and a granted spatial resource. The granted time resource may be based on the second request for wired uplink resources. For example, the information related to the grant of the requested wireless uplink resources may comprise first timing information related to a granted time resource on the wireless uplink. The second request for wired uplink resources may comprise second timing information related to a desired time resource of the requested wired uplink resources. The control module 16 may be configured to coordinate the first timing information and the second timing information. This may enable a streamlining of the scheduling between the two shared media. The control module 16 may be configured to determine the information related to the granted time resource on the wireless uplink based on an estimated delay caused by the second request for wired uplink resources. This may prevent excessive buffering of the uplink data at the wireless network access device 100 or at the network gateway device 300. For examples, the control module 16 may be configured to determine information related to the estimated delay, e.g. by measuring a time between transmitting the second request for wired uplink resources and receiving information related to a grant of the wired uplink resources for a previous first request for wireless uplink resources. For example, the estimated delay may be based on an estimated duration between providing the second request for wired uplink resource and a granted time resource on the wired uplink. The control module 16 may be configured to determine the information related to the granted time resource on the wireless uplink such, that uplink data related to the first request for wireless uplink resources, received by the wireless network access device 100 and forwarded to the network gateway device 300 are likely to arrive at the network gateway device 300 (just) in time for the granted time resource on the wired uplink channel. Alternatively or additionally, the control module 16 may be configured to determine the second timing information related to the desired time resource based on the information related to the granted time resource on the wireless uplink. For example, the second time information related to the desired time resource may be determined based on an estimated delay caused by granting the first request for wireless uplink resources, receiving the uplink data at the wireless network access device 100 and forwarding the uplink data to the network gateway device 300.

The control module 16 may be configured to receive the uplink data from the wireless communication device 200, and to (directly) forward the (received) uplink data to the network gateway device 300. The control module 16 may be configured to provide the second request for wired uplink resources to the gateway device 300 before receiving the uplink data. This may enable requesting the wired uplink resources beforehand, so that they are available once the uplink data arrives at the network gateway device. For example, the control module 16 may be configured to provide the second request for wired uplink resources before a time resource granted for the wireless communication device 200 based on the first request for wireless uplink resources. The control module 16 may be configured to receive the uplink data based on the information related to the grant. For example, the information related to the grant may indicate, at which frequency, time, code and/or spatial resource the uplink data is expected to be received from the wireless communication device 200.

In at least some examples, the first request for wireless uplink resources comprises information related to a buffer state at the wireless communication device 200. This may enable the wireless network access device 100 and/or the network gateway device 300 to estimate, whether the available wired uplink resources are sufficient for the uplink data waiting to be transmitted. The information related to the buffer state at the wireless communication device 200 may indicate an amount of data waiting to be transmitted via the wireless uplink channel and/or via the wired uplink channel. The information related to the buffer state may correspond to a buffer status report of the wireless communication device 200. The control module 16 may be configured to provide the second request for wired uplink resources to the gateway device 300 based on the information related to the buffer state at the wireless communication device 200. For example, if the information related to the buffer state of the wireless communication indicates a first higher amount of data waiting to be transmitted, the control module 16 may be configured to provide the second request for wired uplink resources to the gateway device 300 such, that a first higher amount of wired uplink resources is requested within the second request for wired uplink resources, or with an indicator, that the second request for wired uplink resources are to be prioritized in relation to other wireless communication devices. If the information related to the buffer state of the wireless communication indicates a second lower amount of data waiting to be transmitted, the control module 16 may be configured to provide the second request for wired uplink resources to the gateway device 300 such, that a second lower amount of wired uplink resources is requested within the second request for wired uplink resources, or with an indicator, that the second request for wired uplink resources are to be of a lower priority in relation to other wireless communication devices.

In various examples, the control module 16 may be configured to receive information related to granted requests for wired uplink resources of the wired uplink channel from the gateway device 200. This may enable the wireless network access device 100 to estimate, whether there is enough capacity on the shared medium for the data transmissions of the wireless communication device 200. For example, the information related to the granted requests may indicate a delay between a request and a grant of one or more requests for wired uplink resources or an amount of requests for wired uplink resources for wired uplink resources being granted on average per unit of time. The control module 16 may be configured to detect a mismatch between the information related to the granted requests for wired uplink resources of the wired uplink channel and the information related to the buffer state at the wireless communication device. For example, if the information related to the buffer state of the wireless communication indicates a first higher amount of data waiting to be transmitted, and the information related to the granted requests indicates a high delay between a request and a grant of one or more requests for wired uplink resources or a low amount of requests for wired uplink resources for wired uplink resources being granted on average per unit of time, a mismatch may be detected. The control module 16 may be configured to provide data flow information (e.g. "backpressure") to the wireless communication device 200 if a mismatch between the information related to the granted requests for wired uplink resources of the wired uplink channel and the information related to the buffer state at the wireless communication device is detected. Using the data flow information, the wireless communication device may alter or adapt the uplink data, e.g. by changing a quality or data rate of the uplink data.

In some examples, the control module 16 may be configured to receive information related to a grant of the requested wired uplink resources from the network gateway device 300. The control module 16 may be configured to determine the information related to the grant of the requested wireless uplink resources based on the information related to the grant of the requested wired uplink resources. Alternatively, the control module 16 may be configured to provide the information related to the grant of the requested wireless uplink resources before receiving the information related to the grant of the wired uplink resources. The control module 16 may be configured to forward the received uplink data based on the information related to the grant of the requested wired uplink resource.

More details and aspects of the apparatus 10, the wireless network access device 100 and/or the method are mentioned in connection with the proposed concept or one or more examples described below (e.g. FIGS. 2a to 9). The apparatus 10, the wireless network access device 100 and/or the method may comprise one or more additional optional features corresponding to one or more aspects of the proposed concept or one or more examples described below.

Figure 2A:
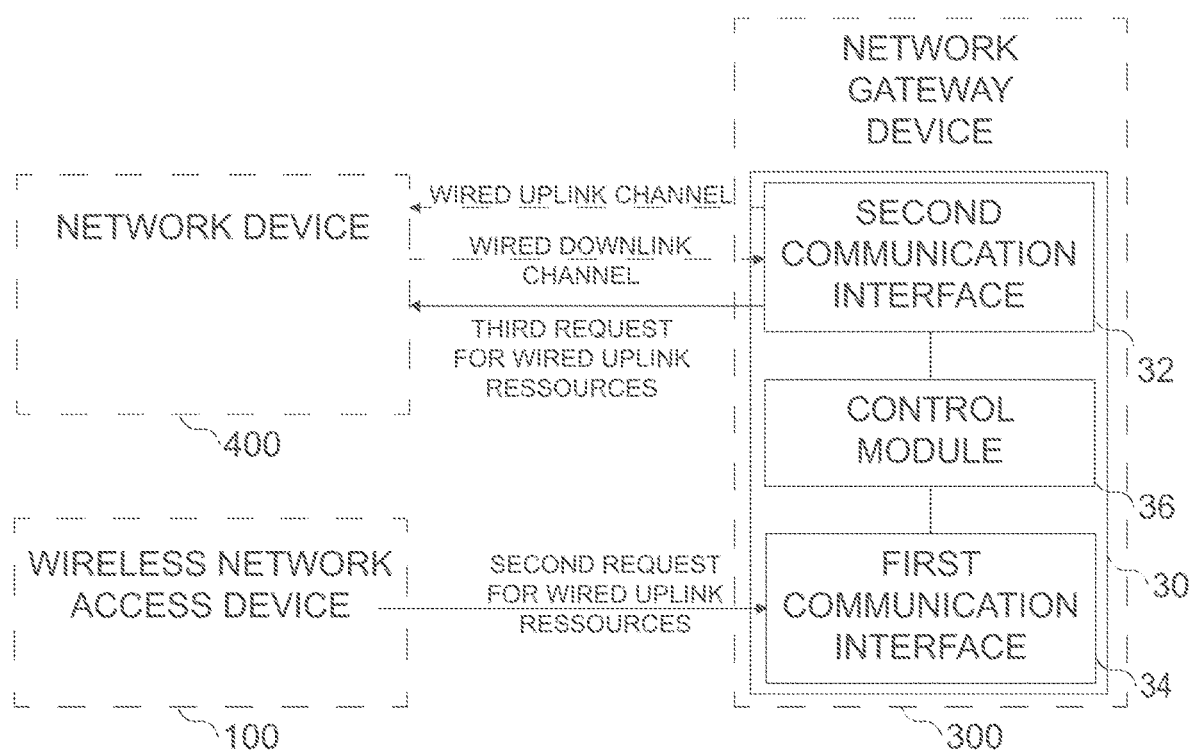
FIG. 2a illustrates a block diagram of an example of an apparatus or a device for a network gateway device.

FIG. 2a illustrates a block diagram of an example of an apparatus 30 or a device 30 for a network gateway device 300. The described apparatus 30 corresponds to a device 30. The components of the device 30 are defined as component means which correspond to the respective structural components of the apparatus 30. Examples further provide the network gateway device 300 comprising the apparatus 30 or the device 30. FIG. 2a further shows the network gateway device 300 comprising the apparatus 30 or the device 30.

The apparatus 30 comprises a first communication interface 32 for communicating with a network device 400 of a remote network using a wired uplink channel and a wired downlink channel. The first communication interface 32 of the apparatus 30 corresponds to a first means for communicating 32 of the device 30. The apparatus 30 comprises a second communication interface 34 for communicating with a wireless network access device 100. The second communication interface 34 of the apparatus 30 corresponds to a means for communicating 34 of the device 30. The apparatus 30 further comprises a control module 36. The control module 36 of the apparatus 30 corresponds to a means for controlling 36 of the device 30. The control module 36 is configured to receive a second request for wired uplink resources from the wireless network access device 100 via the second communication interface 34. The second request for wired uplink resources is related to uplink resources of the wired uplink channel. The control module 36 is configured to provide a third request for wired uplink resources on the wired uplink channel to the network device 400 based on the second request for wired uplink resources via the first communication interface 32.

Figure 2B:
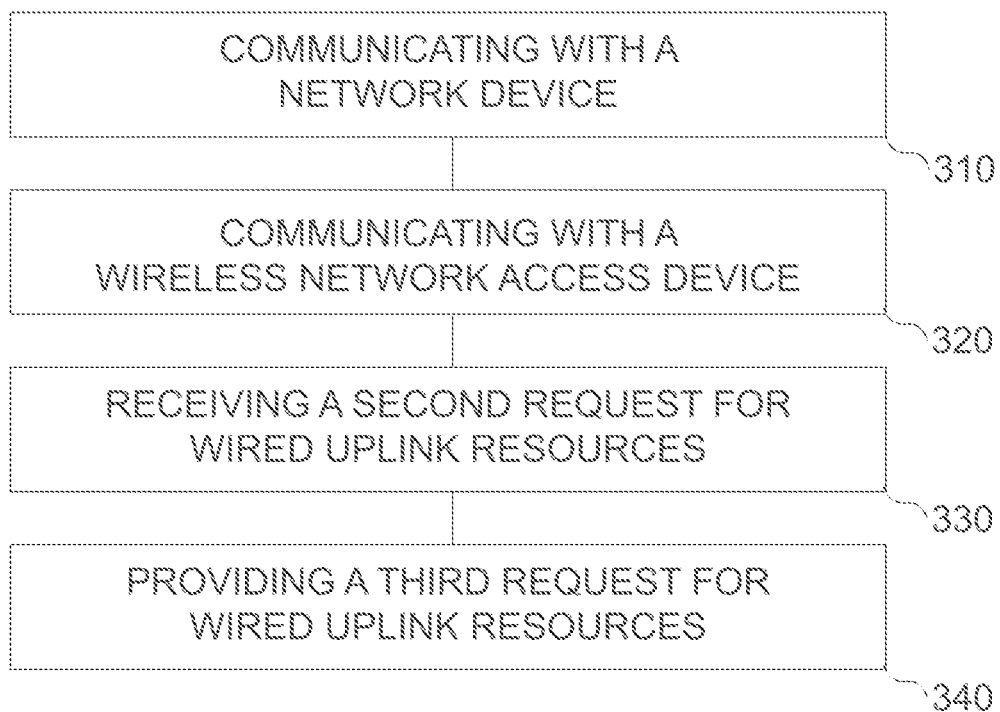
FIG. 2b illustrates a flow chart of an example of a method for a network gateway device.

FIG. 2b illustrates a flow chart of an example of a corresponding method for the network gateway device 300. The method comprises communicating 310 with a network device 400 of a remote network using a wired uplink channel and a wired downlink channel using a first communication interface. The method further comprises communicating 320 with a wireless network access device 100 using a second communication interface. The method further comprises receiving 330 a second request for wired uplink resources from the wireless network access device 100 via the second communication interface 34. The second request for wired uplink resources is related to uplink resources of the wired uplink channel. The method further comprises providing 340 a third request for wired uplink resources on the wired uplink channel to the network device 400 based on the second request for wired uplink resources.

The first communication interface 32 may correspond to one or more inputs and/or outputs for receiving and/or transmitting information, which may be in digital (bit) values according to a specified code, within a module, between modules or between modules of different entities. For example, the first communication interface 32 may be configured to communicate using a Data Over Cable Service Interface Specification (DOCSIS). The first communication interface 32 may be a cable communication interface 32. The first communication interface 32 may be configured to communicate via a coaxial cable. The first communication interface is configured to communicate with the network device 400 using the wired uplink channel and a wired downlink channel. The wired uplink channel and/or the wired downlink channel may be based on the Data Over Cable Service Interface Specification. The wired uplink channel and/or the wired downlink channel may be the wired uplink channel and/or the wired downlink channel of a (coaxial) cable internet connection.

The second communication interface 34 may correspond to one or more inputs and/or outputs for receiving and/or transmitting information, which may be in digital (bit) values according to a specified code, within a module, between modules or between modules of different entities. The second communication interface 34 may be configured to communicate with the wireless network access device 100 using a wired or wireless communication channel. For example, the second communication interface 34 may be configured to communicate with the wireless network access device 100 using a wired communication channel, e.g. an Ethernet connection, a Peripheral Control Interface Express interface, an Universal Serial Bus interface, via signal traces on a Printed Circuit Board or within the same chip or chip package. In some examples, the wireless network access device 100 and the network gateway device 300 may be comprised in the same device, e.g. within a wireless network gateway.

In various examples, the control module 36 may be implemented using one or more processing units, one or more processing devices, any means for processing, such as a processor, a computer or a programmable hardware component being operable with accordingly adapted software. In other words, the described function of the control module 36 may as well be implemented in software, which is then executed on one or more programmable hardware components. Such hardware components may comprise a general purpose processor, a Digital Signal Processor (DSP), a micro-controller, etc.

In at least some examples, the second request for wired uplink resources may be implemented similar to the second request for wired uplink resources introduced in connection with FIGS. 1a and 1b.

The control module 36 is configured to provide a third request for wired uplink resources on the wired uplink channel to the network device 400 based on the second request for wired uplink resources via the first communication interface 32. The t wired uplink resources may be requested by the control module 36 from a counterpart station of the wired uplink, e.g. from a cable modem termination service. For example, the network device 400 may be or provide a cable modem termination service for the network gateway device 300. For example, using the third request for wired uplink resources, the network gateway 300 may request frequency, time and/or code resources for transmitting uplink data via the wired uplink channel, e.g. to the network device 400 and/or to the internet via the network device 400. The control module 36 may be configured to determine the third request for wired uplink resources based on the second request for wired uplink resources.

In various examples, the control module 36 may be configured to translate the second request for wired uplink resources into the third request for wired uplink resources, e.g. into the DOCSIS protocol.

For example, the second request for wired uplink resources may comprise information related to a desired quality of service for the transmission of uplink data via the wired uplink channel. In some examples, the third request for wired uplink resources of the wired uplink channel comprises information related to a desired quality of service for a transmission of uplink data via the wired uplink channel. The control module 36 may be configured to determine the third request for wired uplink resources based on the information related to a desired quality of service for a transmission of uplink data comprised in the second request for wired uplink resources. The control module 36 may be configured to translate the information related to the desired quality of service for the transmission of uplink data via the wired uplink channel for the third request for wired uplink resources. For example, based on a QoS setting within the second request for wired uplink resources, the control module 36 may be configured to choose a corresponding QoS setting for the third request for wired uplink resources. This may enable a conversion of QoS indicators between different protocols.

In various examples, the request for wired uplink resources of the wired uplink channel comprises information related to an estimated size of uplink data to be transmitted. The control module 36 may be configured to determine the third request for wired uplink resources based on the information related to the estimated size of uplink data to be transmitted comprised in the second request for wired uplink resources. The control module 36 may be configured to translate the information related to an estimated size of uplink data to be transmitted for the third request for wired uplink resources.

Additionally or alternatively, the second request for wired uplink resources may comprise information related to a desired time resource for the requested wired uplink resources. The desired time resource may be based on a time required for the wireless communication device 200 and the wireless network access device 100 to transmit the uplink data to the network gateway device 300. The control module 36 may be configured to provide the third request for wired uplink resources based on the information related to the desired time resource. For example, the control module 36 may be configured to control a timing of providing the third request for wired uplink resources based on the information related to the desired time resource. Alternatively or additionally, the third request for wired uplink resources may comprise the information related to the desired time resource for the requested wired uplink resources, e.g. a translated version of the information related to the desired time resource for the requested wired uplink resources. In some examples, the control module 36 may be configured to translate the information related to the desired time resource for the requested wired uplink resources for the third request for wired uplink resources.

In at least some examples, the control module 36 is configured to receive uplink data related to the second request for wired uplink resources from the wireless network access device 100 and to forward the uplink data to the network device 400 via the wired uplink channel, e.g. to the internet via the network device 400. In some examples, the control module 36 may be configured to re-package and/or encode the uplink data for the wired uplink channel. For example, the control module 36 may be configured to encapsulate the uplink data for the wired uplink channel.

In various examples, the third request for wired uplink resources may be granted by the network device 400. The control module 36 may be configured to receive information related to the grant of the wired uplink resources. The control module 36 may be configured to provide the uplink data via the wired uplink channel, e.g. based on the information related to the grant of the wired uplink resources. The control module 36 may be configured to provide the information related to the grant of the wired uplink resources to the wireless network access device 100. The control module 36 may be configured to translate the information related to the grant of the wired uplink resources for the wireless network access device 100.

In some examples, the control module 36 may be configured to provide information related to granted requests for wired uplink resources to the wireless network access device 100 based on previously received requests for wired uplink resources of the wired uplink channel. This may enable the wireless network access device 100 to estimate, whether there is enough capacity on the shared medium for the data transmissions of the wireless communication device 200. The information related to the granted requests for wired uplink resources may be implemented similar to the information related to the granted requests for wired uplink resources introduced in connection with FIGS. 1a and 1b. The control module 36 may be configured to determine the information related to the granted requests for wired uplink resources based on the previously received requests for wired uplink resources, e.g. by determining a delay between a request and a grant of one or more requests for wired uplink resources or an amount of requests for wired uplink resources for wired uplink resources being granted on average per unit of time.

More details and aspects of the apparatus 30, the network gateway device 300 and/or the method are mentioned in connection with the proposed concept or one or more examples described above or below (e.g. FIGS. 1a, 1b, 3a to 9). The apparatus 30, the network gateway device 300 and/or the method may comprise one or more additional optional features corresponding to one or more aspects of the proposed concept or one or more examples described above or below.

Figure 3A:
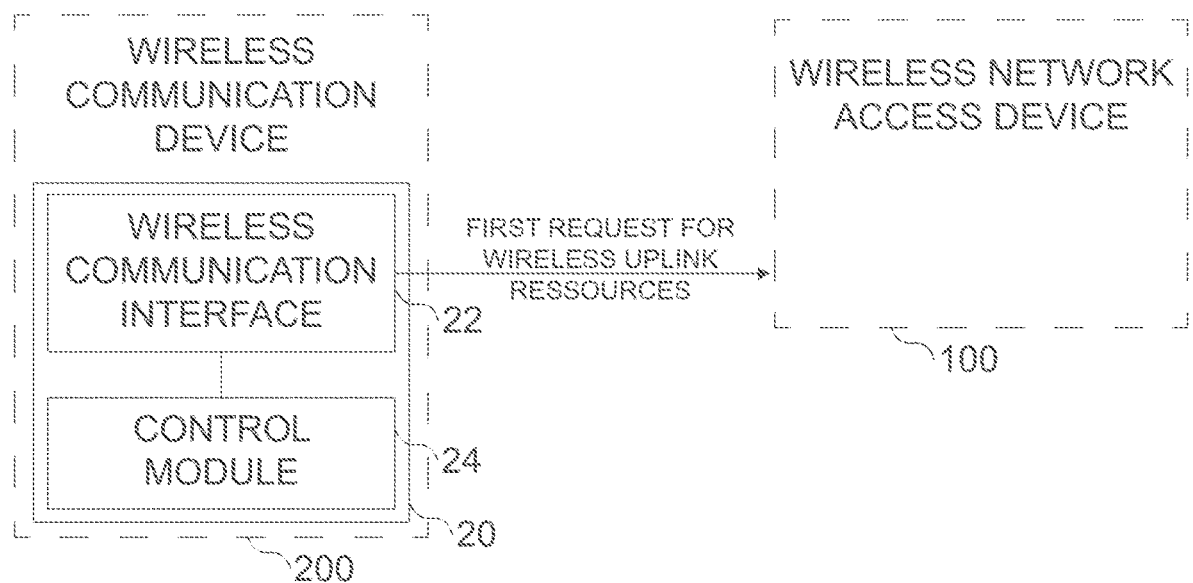
FIG. 3a illustrates a block diagram of an example of an apparatus or a device for a wireless communication device.

FIG. 3a illustrates a block diagram of an example of an apparatus 20 or a device 20 for a wireless communication device 200. The described apparatus 20 corresponds to a device 20. The components of the device 20 are defined as component means which correspond to the respective structural components of the apparatus 20. Examples further provide the wireless communication device 200 comprising the apparatus 20 or the device 20. FIG. 3a further shows the wireless communication device 200 comprising the apparatus 20 or the device 20.

The apparatus 20 comprises a wireless communication interface 22 for wirelessly communicating with a wireless network access device 100. The wireless communication interface 22 of the apparatus 20 corresponds to a means for communicating wirelessly 22 of the device 20. The apparatus 20 further comprises a control module 24. The control module 24 of the apparatus 20 corresponds to a means for controlling 24 of the device 20.

The control module 24 is configured to transmit a first request for wireless uplink resources to the wireless network access device 100 via the wireless communication interface 22. The first request for wireless uplink resources is associated with uplink data to be transmitted via the wireless network access device 100 and via a wired uplink channel of a network gateway device 300. The first request for wireless uplink resources comprises information related to a desired quality of service for the transmission of the uplink data via the wired uplink channel of the gateway device 300.

Figure 3B:
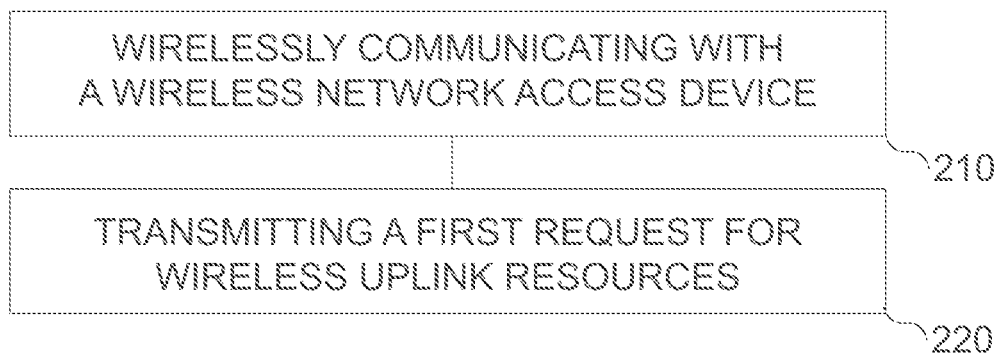
FIG. 3b illustrates a flow chart of an example of a method for a wireless communication device.

FIG. 3b illustrates a flow chart of an example of a corresponding method for a wireless communication device 200. The method comprises wirelessly communicating 210 with a wireless network access device 100 using a wireless communication interface. The method further comprises transmitting 220 a first request for wireless uplink resources to the wireless network access device 100. The first request for wireless uplink resources is associated with uplink data to be transmitted via the wireless network access device 100 and via a wired uplink channel of a network gateway device

300. The first request for wireless uplink resources comprises information related to a desired quality of service for the transmission of the uplink data via the wired uplink channel of the gateway device 300.

The wireless communication interface 22 may correspond to one or more inputs and/or outputs for receiving and/or transmitting information, which may be in digital (bit) values according to a specified code, within a module, between modules or between modules of different entities. The wireless communication interface 22 may be configured to communicate wirelessly with the wireless network access device 100, e.g. via a wireless local area network (WLAN). For example, the wireless communication interface 2 may be configured to communicate using or based on an Institute of Electrical and Electronics Engineers (IEEE) standard 802.11ax. The wireless communication interface 22 may be configured to wirelessly communicate with the wireless network access device 100 using a Wireless Local Area Network. In at least some examples, the wireless communication interface 22 is configured to wirelessly communicate with the wireless network access device 100 using a wireless communication channel. The wireless communication channel may be based on Institute of Electrical and Electronics Engineers (IEEE) standard 802.11ax. The wireless communication channel may be implemented similar to wireless communication channel introduced in connection with FIGS. 1a and 1b. For examples, the first request for wireless uplink resources may be transmitted as control information on a data link layer of the wireless communication channel.

In various examples, the control module 24 may be implemented using one or more processing units, one or more processing devices, any means for processing, such as a processor, a computer or a programmable hardware component being operable with accordingly adapted software. In other words, the described function of the control module 24 may as well be implemented in software, which is then executed on one or more programmable hardware components. Such hardware components may comprise a general purpose processor, a Digital Signal Processor (DSP), a micro-controller, etc.

In various examples, the first request for wireless uplink resources may be implemented similar to the first request for wireless uplink resources introduced in connection with FIGS. 1a and 1b. The first request for wireless uplink resources comprises information related to a desired quality of service for the transmission of the uplink data via the wired uplink channel of the gateway device 300. For example, the information related to the desired quality of service may comprise one or more elements of the group of information related to a (minimal) data rate of the uplink data, information related to a (maximal) latency for transmitting the uplink data (e.g. a maximal round trip time), information related to an out-of-order delivery of the uplink data, and information related to a (maximal) error rate of a transmission of the uplink data. Additionally or alternatively, the first request for wireless uplink resources comprises information related to an estimated size of the uplink data to be transmitted.

The control module 24 may be configured to transmit the uplink data to the wireless network access device 100 based on the first request for wireless uplink resources. For example, the control module 24 may be configured to receive information related to a grant of the requested wireless uplink resources from the wireless network access device 100 via the wireless communication interface 22. The control module 26 may be further configured to transmit the uplink data associated with the first request for wireless uplink resources based on the information related to the grant of the requested wireless uplink resources. For example, the information related to the grant of the requested wireless uplink resources may comprise information related to one or more of a frequency resource, a time resource, a code resource and a spatial resource granted for the transmission of the uplink data. The control module 26 may be configured to transmit the uplink data associated with the first request for wireless uplink resources based on the information related to one or more of a frequency/time/code/spatial resource granted for the transmission of the uplink data.

In some examples, the first request for wireless uplink resources comprises information related to a buffer state at the wireless communication device. The information related to the buffer state at the wireless communication device 200 may indicate an amount of data waiting to be transmitted by the wireless communication device 200 via the wireless uplink channel and/or via the wired uplink channel. The control module 24 may be configured to receive data flow information (e.g. backpressure) from the wireless network access device 100 via the wireless communication interface 22 in response to the information related to the buffer state or in response to the information related to the estimated size of the uplink data to be transmitted. The control module 24 may be configured to alter the uplink data to be transmitted to adapt the uplink data to be transmitted to the data flow information. For example, the control module 26 may be configured to provide a control signal to one or more software applications associated with the uplink data to affect a change in the quality or data rate of the uplink data based on the data flow information. For example, if the data flow information indicates that the desired quality of service might not be reached or that the estimated size of the uplink data might be too large, the control module 24 may be configured to provide the control signal to the one or more software applications to lower a quality of data rate of the uplink data.

More details and aspects of the apparatus 20, the wireless communication device 200 and/or the method are mentioned in connection with the proposed concept or one or more examples described above or below (e.g. FIGS. 1a to 2b, 4a to 9). The apparatus 20, the wireless communication device 200 and/or the method may comprise one or more additional optional features corresponding to one or more aspects of the proposed concept or one or more examples described above or below.

Figure 4A:
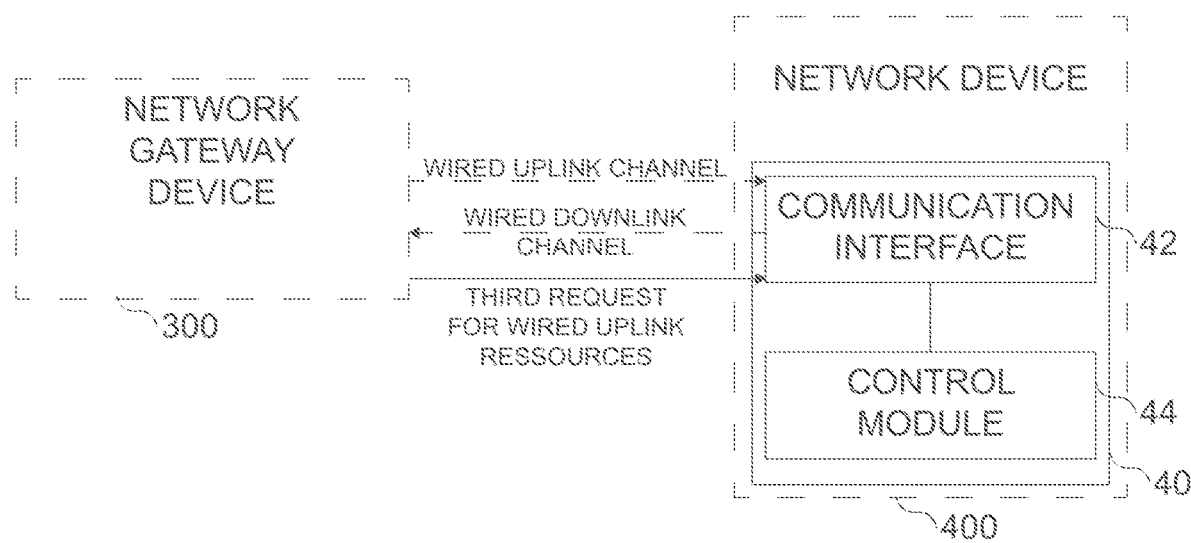
FIG. 4a illustrates a block diagram of an example of an apparatus or a device for a network device.

FIG. 4a illustrates a block diagram of an example of an apparatus 40 or a device 40 for a network device 400. The described apparatus 40 corresponds to a device 40. The components of the device 40 are defined as component means which correspond to the respective structural components of the apparatus 40. Examples further provide the network device 400 comprising the apparatus 40 or the device 40. FIG. 4a further shows the network device 400 comprising the apparatus 40 or the device 40.

The apparatus 40 comprises a communication interface 42 for communicating with a network gateway device 300 using a wired uplink channel and a wired downlink channel. The communication interface 42 of the apparatus 40 corresponds to a means for communicating 42 of the device 40. The wired uplink channel is suitable for transmitting data from the network gateway device 300 to the network device 400. The wired downlink channel is suitable for transmitting data from the network device 400 to the network gateway device 300. The apparatus 40 further comprises a control module 44. The control module 44 of the apparatus 40 corresponds to a means for controlling 44 of the device 40. The control module 44 is configured to receive a request for wired uplink resources on the wired uplink channel via the communication interface 42. The request for wired uplink resources on the wired uplink channel comprises information related to a desired time resource for the requested wired uplink resources. The control module 44 is configured to grant the request for the wired uplink resources of the wired uplink channel based on the information related to the desired time resource via the communication interface 42.

Figure 4B:
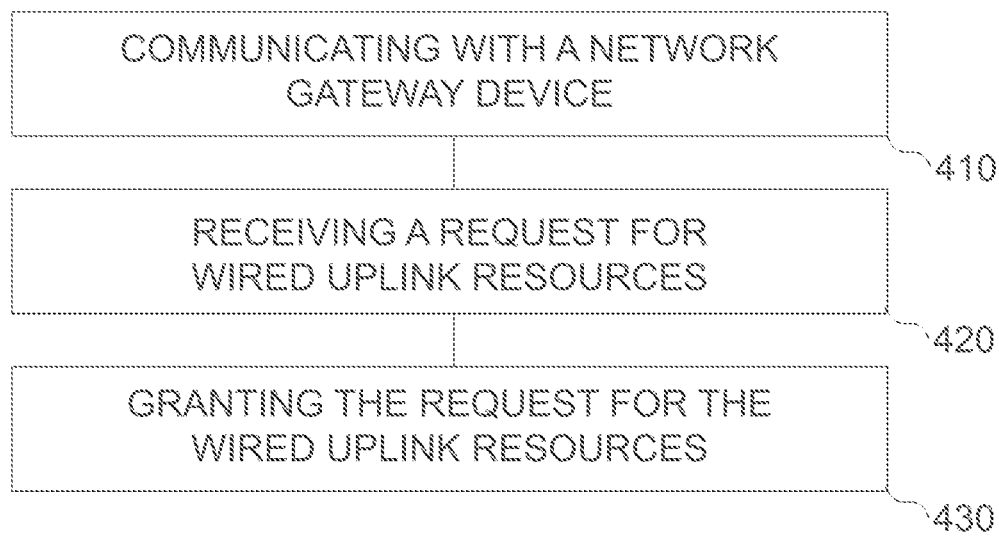
FIG. 4b illustrates a flow chart of an example of a method for a network device.

FIG. 4b illustrates a flow chart of an example of a corresponding method for the network device 400. The method comprises communicating 410 with a network gateway device 300 using a wired uplink channel and a wired downlink channel. The wired uplink channel is suitable for transmitting data from the network gateway device 300 to the network device 400. The wired downlink channel is suitable for transmitting data from the network device 400 to the network gateway device 300. The method further comprises receiving 420 a request for wired uplink resources on the wired uplink channel. The request for wired uplink resources on the wired uplink channel comprises information related to a desired time resource for the requested wired uplink resources. The method further comprises granting 430 the request for the wired uplink resources of the wired uplink channel based on the information related to the desired time resource.

In at least some examples, the network device 400 is a counterpart station of the network gateway device 300, e.g. a cable modem termination service (CMTS). The network device 400 may be configured to control, assign and/or grant the wired uplink resources on the wired uplink channel and/or the wired downlink channel, e.g. based on the third request for wireless uplink resources. The request for wired uplink resources of the apparatus 40 and the method of FIGS. 4a and 4b corresponds to the third request for wired uplink resources introduced in connection with FIGS. 2a and 2b.

The communication interface 42 may correspond to one or more inputs and/or outputs for receiving and/or transmitting information, which may be in digital (bit) values according to a specified code, within a module, between modules or between modules of different entities. For example, the communication interface 42 may be configured to communicate using a Data Over Cable Service Interface Specification (DOCSIS). The communication interface 42 may be a cable communication interface 42. The communication interface 42 may be configured to communicate via one or more coaxial cables. The communication interface 42 is configured to communicate with the network gateway device 300 using the wired uplink channel and a wired downlink channel. The wired uplink channel and/or the wired downlink channel may be based on the Data Over Cable Service Interface Specification. The wired uplink channel and/or the wired downlink channel may be the wired uplink channel and/or the wired downlink channel of a (coaxial) cable internet connection. In at least some examples, the communication interface 42 may be configured to communicate with a plurality of network gateway devices via a shared medium, e.g. a coaxial cable system. The plurality of network gateway devices may comprise the network gateway device 300.

In various examples, the control module 44 may be implemented using one or more processing units, one or more processing devices, any means for processing, such as a processor, a computer or a programmable hardware component being operable with accordingly adapted software. In other words, the described function of the control module 44 may as well be implemented in software, which is then executed on one or more programmable hardware components. Such hardware components may comprise a general purpose processor, a Digital Signal Processor (DSP), a micro-controller, etc.

In various examples, the request for wired uplink resources on the wired uplink channel comprises information related to a desired time resource for the requested wired uplink resources. The control module 44 is configured to grant the request for the wired uplink resources of the wired uplink channel based on the information related to the desired time resource via the communication interface 42. This may enable coordinating the granted time resource with a time, at which the uplink data arrives at the network gateway device 300. For example, the information related to the desired time resource may indicate a time the network gateway 300 would prefer the wired uplink resources to be granted for, e.g. a time, at which the network gateway 300 is prepared to transmit the uplink data. In some examples, the control module 44 may be configured to delay granting the requested wired uplink resources based on the information related to the desired time resource. Alternatively or additionally, may be configured to provide information related to the grant of the wired uplink resources to the network gateway device 300. The information related to the grant may comprise information related to the granted time resource. The control module 44 may be configured to determine the granted time resource based on the information related to the desired time resource. For example, the desired time resource may be defined relative to a transmission time resource of the (third) request for wired uplink resources.

In various examples, the request for wired uplink resources of the wired uplink channel comprises information related to a desired quality of service for a transmission of uplink data via the wired uplink channel. The control module 44 may be configured to grant the request for wired uplink resources on the wired uplink channel based on the information related to the desired quality of service for the transmission of uplink data via the wired uplink channel. For example, the control module 44 may be configured to provide information related to the grant of the wired uplink resources to the network gateway device 300. The information related to the grant of the wired uplink resources may comprise information related to one or more of a granted frequency resource, a granted time resource and a granted code resource. The control module 44 may be configured to determine one or more of the granted frequency resource, the granted time resource and the granted code resource based on the information related to the desired quality of service.

In at least some examples, the request for wired uplink resources of the wired uplink channel comprises information related to an estimated size of uplink data to be transmitted. The control module 44 may be configured to grant the request for wired uplink resources on the wired uplink channel based on the information related to the estimated size of uplink data to be transmitted. The control module 44 may be configured to determine one or more of the granted frequency resource, the granted time resource and the granted code resource based on the information related to the estimated size of uplink data to be transmitted More details and aspects of the apparatus 40, the network device 400 and/or the method are mentioned in connection with the proposed concept or one or more examples described above or below (e.g. FIGS. 1a to 3b, 5 to 9). The apparatus 40, the network device 400 and/or the method may comprise one or more additional optional features corresponding to one or more aspects of the proposed concept or one or more examples described above or below.

Examples further provide a delay mitigation device (e.g. the wireless network access device 100 or the wireless network gateway) for a communication network having at least two communication devices of different protocols (e.g. the wireless communication device 200/the wireless network access device 100 and the network gateway device 300/the network device 400) comprising circuitry (e.g. the control module 16) configured to determine a delay (e.g. the first timing information and/or the second timing information) caused by one or the other device during an initialization of one or the other initialization device, wherein the circuitry is configured to coordinate (e.g. by providing the second request for wired uplink resources) a timing of traffic (e.g. the transmission of the uplink data) based on the delay.

In some examples, the different protocols are WLAN and DOCSIS.

In some examples, the circuitry is part of one or the other communication device (e.g. of the wireless network access device 100 or of the wireless network gateway.

In various examples, the circuitry is configured to create a new message (e.g. the second request for wired uplink resources) between a scheduler (e.g. the wireless network access device 100) and a remote modem (e.g. the network gateway device 300).

In some examples, the message carries an estimated transmission size (e.g. the information related to the estimated size of uplink data to be transmitted) and time (e.g. the information related to the desired time resource) in which the data is expected to be received.

In some examples, the message is internal to one or the other communication devices (e.g. between the wireless network access device 100 and the network gateway device 300).

In some examples, the device comprises a range extender (e.g. the wireless network access device 100) that forwards the traffic.

Examples further provide a wireless network gateway comprising the wireless network access device 100 (with the apparatus 10) and the network gateway device 300 (with the apparatus 30). Examples further provide a system comprising the wireless network access device 100 (with the apparatus 10), the network gateway device 300 (with the apparatus 30) (e.g. as wireless network gateway) and the wireless communication device 200 (with the apparatus 20). The system may further comprise the network device 400.

At least some examples relate to a method for providing low latency services in a WiFi (Wireless Fidelity, a wireless local area network) and DOCSIS scheduled Network.

Modern services like live VR/AR (Virtual Reality/Augmented Reality) may require a low latency between the device and the cloud service that may be of different grade than exists today. Currently a network that consists of or comprises WiFi and DOCSIS may struggle to meet target latency values. Traffic from a WiFi client to the Internet via a DOCSIS access network may suffer from a high network latency where the two major contributors may be the WiFi network and the DOCSIS network. More specifically, the non-synchronized WiFi upstream scheduling and DOCSIS upstream scheduling may contribute significant latency. In order to provide such desired services, latency may be significantly reduced.

In some systems, WiFi might not be a truly scheduled medium while DOCSIS is. When a packet is sent upstream from a WiFi client via a cable gateway, there is no synchronization between the WiFi (Institute of Electrical and Electronics Engineers (IEEE) 802.11) network and the DOCSIS network. First the packet may be sent to the embedded WiFi access point and then through the cable modem to the CMTS (Cable Modem Termination System) and on, with no synchronization between the two communications components.

In some systems, the latencies of the WiFi network and the DOCSIS network may simply accumulate. There might be no mechanism to parallelize scheduling operations so the overall latency from a station to the CMTS may be on average the sum of the average latencies of both links.

In order to support the new low latency services, according to at least some examples, new DOCSIS and WiFi traffic aware communications mechanisms that provide scheduling synchronization may be applied.

The mechanism may include the setting up of a synchronized communication link between the WiFi Access Point (e.g. the network access device 100) chip (e.g. the apparatus 10) and Cable Modem. WiFi AP (Access Point) could be embedded in the same device as the Cable Modem (e.g. the network gateway device 300) or in a different device (WiFi Range Extender). In the latter case, synchronization mechanism may take care of changing WiFi airlink conditions: RF (Radio Frequency) interference and contention on the channel that could introduce additional variable delays for the inter-AP communication. The mechanism may compensate to limit such variable delays, enabling constant latency of communication between the WiFi AP chip and Cable Modem.

Examples may provide a concept of implementation for DOCSIS and WiFi coupled scheduling and operation methodology and synchronization signaling for low latency traffic aware services. The methodology provide a way to synchronize the 802.11ax (WiFi) scheduler (e.g. the wireless network access device 100) with the DOCSIS scheduler (e.g. the network device 100).

The methodology may be based on the following synchronization signaling:

Setting Up Communication Control Link Between WiFi AP Chip or Chips (in Case of WiFi Backhaul) and Cable Modem:

The Control Link may be used to establish common time base between WiFi AP chip that participates in the low latency traffic transmission via the Cable Modem embedded in the Residential Gateway. A communication delay between participating WiFi AP chip and Cable Modem may be measured and used by WiFi AP low latency coordination function to issue just-in-time requests for uplink traffic grants from the client with a Low Latency (LL) application or WiFi AP in the range extender that communicates with the residential gateway over WiFi backhaul.

Scheduling Notifications:

When the 802.11ax scheduler decides to schedule an upstream transmission, a scheduling notification may be sent to the DOCSIS scheduler. The notifications includes: transaction timing information (start time, end time, duration), transaction content info (number of bytes, service type), transaction QoS (delay, priority, etc.).

Scheduling Response:

The DOCSIS scheduler may send a confirmation/response with modify transaction parameters.

Maintaining the Control Link Between WiFi AP Chip and Cable Modem:
To enable low-variance of the delay in communication between the WIFi AP and Cable Modem.

Based on the signaling, the DOCSIS Cable Modem scheduler may send a request for a transmission slot from the CMTS that meets the transaction profile and timing so that when the transmission bytes will be transferred from the WiFi to DOCSIS it may be immediately sent (e.g. with minimal DOCSIS buffering time, reducing to minimum the time the packets spent queued at the CM waiting for transmission).

Based on examples, WiFi traffic may show significantly lower latency over cable networks.

In various examples, a cable gateway device (e.g. the network gateway device 300) with an integrated IEEE 802.11 (WiFi) access point (e.g. the wireless network access device 100) may connect clients in the home with the access network through the Cable Modem Termination System (CMTS) (e.g. the network device 400). The integrated WiFi Access Point may comprise a scheduler configured to schedule IEEE 802.11 transmissions of data between the stations and the gateway. In the latest revision of the standard, 802.11ax, the WiFi scheduler may be configured to control the exact timeslots in which stations transmit by granting them with transmission time and duration in particular the UL WiFi scheduling (until 802.11ax, the UL (Uplink) transmission was initiated by the STAs (stations) and therefore might not be predictable). The CMTS may be configured to control the exact timeslots in which cable modems transmit by granting them with transmission time and duration.

At least some examples may be based on the following synchronization signaling:
Scheduling Notifications:
When the 802.11ax scheduler decides to schedule an upstream transmission, it sends a scheduling notification (e.g. the second request for wired uplink resources) to the DOCSIS scheduler. The notifications may comprise one or elements of the group of transaction timing information (start time, end time, duration), transaction content info (number of bytes, service type), transaction QoS (delay, priority, etc.).
Scheduling Response:
DOCSIS scheduler may send a confirmation/response with modify transaction parameters.

Based on his signaling, the DOCSIS Cable Modem scheduler may send a request (e.g. the third request for wired uplink resources) for a transmission slot from the CMTS (Cable Modem Termination System) that meet the transaction profile and timing when the transmission bytes will be transferred from the WiFi to DOCSIS it might be immediately sent (e.g. with a minimal DOCSIS buffering time, thereby reducing (to a minimum) the time the packets spent queued at the cable modem waiting for transmission).

Figure 5:
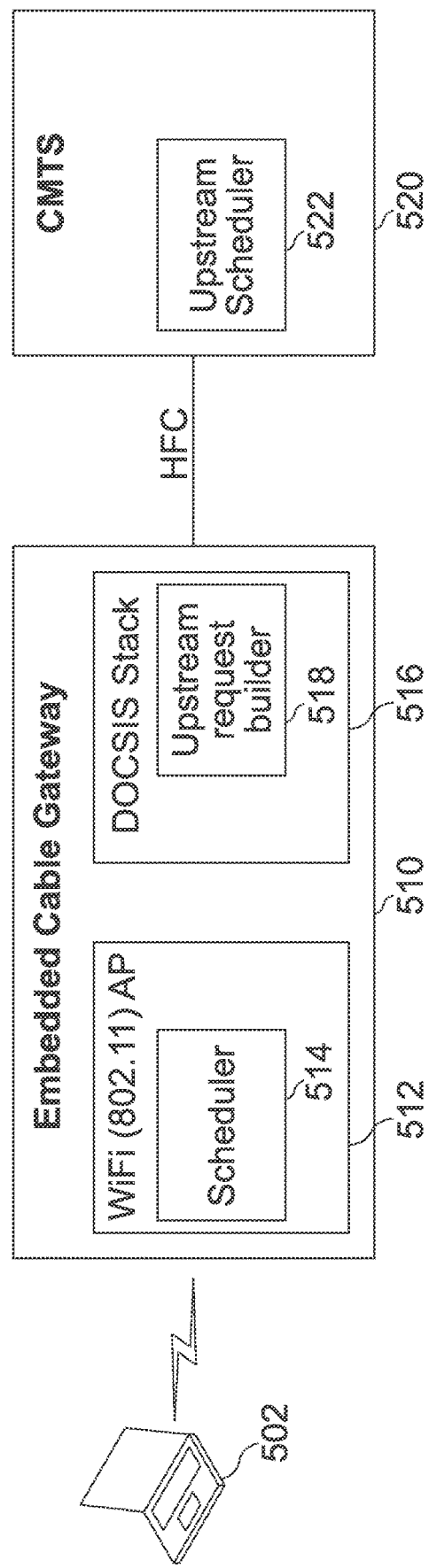
FIG. 5 illustrates a block diagram of an embedded cable gateway.

FIG. 5 illustrates the embedded cable gateway. A wireless communication device 502 (e.g. the wireless communication device 200) communicates wirelessly with an embedded cable gateway 510. The embedded cable gateway 510 comprises a WiFi (802.11) access point 512 (e.g. the network access device 100) with a scheduler 514 (e.g. the apparatus 10) for wirelessly communicating with the wireless communication device 502, and a DOCSIS stack 516 (e.g. the network gateway device 300) with an upstream request builder 518 (e.g. the apparatus 30) for communicating via a HFC with a cable modem termination system 520 (e.g. the network device 400) comprising an upstream scheduler 522.

Figure 6:
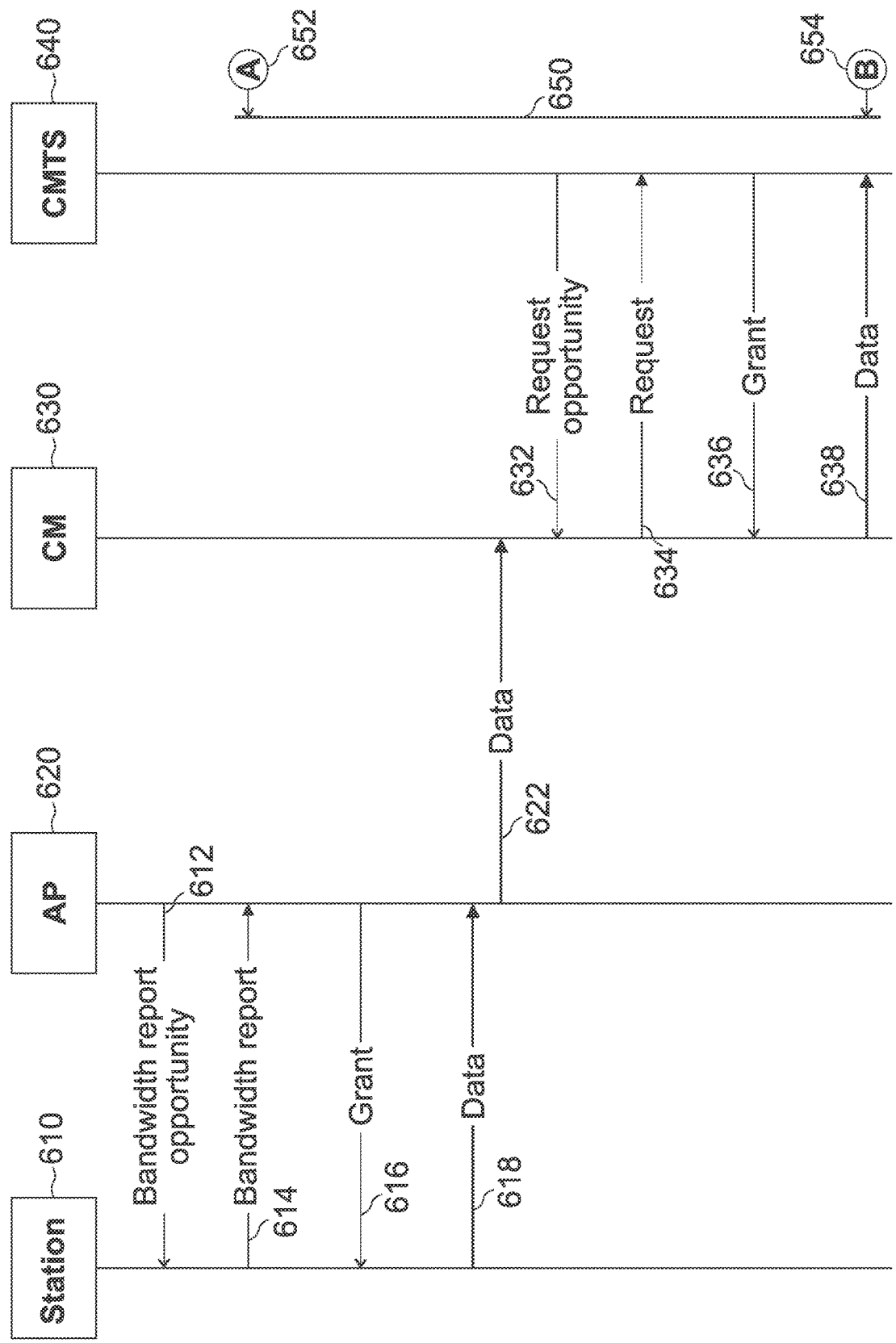
FIG. 6 illustrates an overview of a transmission flow without upstream synchronization.

Examples provide an overview of low latency traffic coordination. Without upstream synchronization between the two communications components schedulers, the transmission flow may be as shown in FIG. 6. The WiFi scheduler 620 (e.g. the apparatus 10) schedules 616 (e.g. grants) a transmission of 'n' bytes for a specific station 610 (e.g. the wireless communication device 200) as a result of the bandwidth report 614 (at a bandwidth report opportunity 612) from that station. Usually, the transmission 618 (of uplink data) may be scheduled for a few milliseconds after the initial bandwidth request. When the transmission 618 is received at the AP 620 (e.g. the network access device 100), it is passed 622 to the cable modem 630 (e.g. the network gateway device 300) almost immediately. The cable modem then requests 634 (at a request opportunity 632) the bandwidth for the received data. The CMTS 640 (e.g. the network device 400) allocates 636 (e.g. grants) the transmission slot a few milliseconds later. Only then is the data being transmitted 638 to the CMTS. The timespan 650 between point A 652 and B 654 in FIG. 6 is the overall time that passed between the stations bandwidth report and the data arriving at the CMTS.

Examples may add a new message between the AP scheduler (e.g. the apparatus 10) and the Cable Modem (CM, e.g. the apparatus 30 or the network gateway device 300), called an Early Bandwidth Notification or EBN (e.g. the second request for wired uplink resources). When the AP schedules a timeslot for a station (e.g. the wireless communication device 100), it may issue an EBN to the CM carrying the estimated transmission size in bytes and the time in which the data is expected to be received. If the AP is integrated with the cable gateway device, the message may be internal to the device where the sender is the AP scheduler and the receiver is the CM upstream request logic.

The CM may assume the data will be provided at the time reported in EBN. It uses a request opportunity from the CMTS (e.g. the network device 400) to send an enhanced request (EREQ) message (e.g. the third request for wired uplink resources) to the CMTS, requesting an upstream slot for the expected data. The EREQ message may differ from a normal DOCSIS REQ message in the extra fields it contains. In some examples, the EREQ might, as a minimum, comprise the following extra fields:
Req_Slot_time:
a 32 bit value representing the DOCSIS 10.24 MHz clock in which the transmission slot is requested. This is the time at which the data is expected to be available at the cable modem after being received by the AP and handed to the cable modem.
Req_Size:
a 32 bit size (in octets) of the requested slot.
Req_QoS_Priority:
an 8 bit QoS (Quality of Service) profile or priority level.

The CMTS is expected to schedule a grant of Req_Size or more bytes, at Req_Slot_time or later for the WiFi data. The Req_QoS_Priority parameter may come to help the CMTS decide how strictly it needs to adhere to this request. While low priority WiFi traffic may be scheduled more loosely, high priority traffic may be scheduled as close to Req_Slot_time to meet overall latency. When the grant transmission time comes from the CMTS, the data which is already at the CM may be rapidly pushed for transmission.

Figure 7:
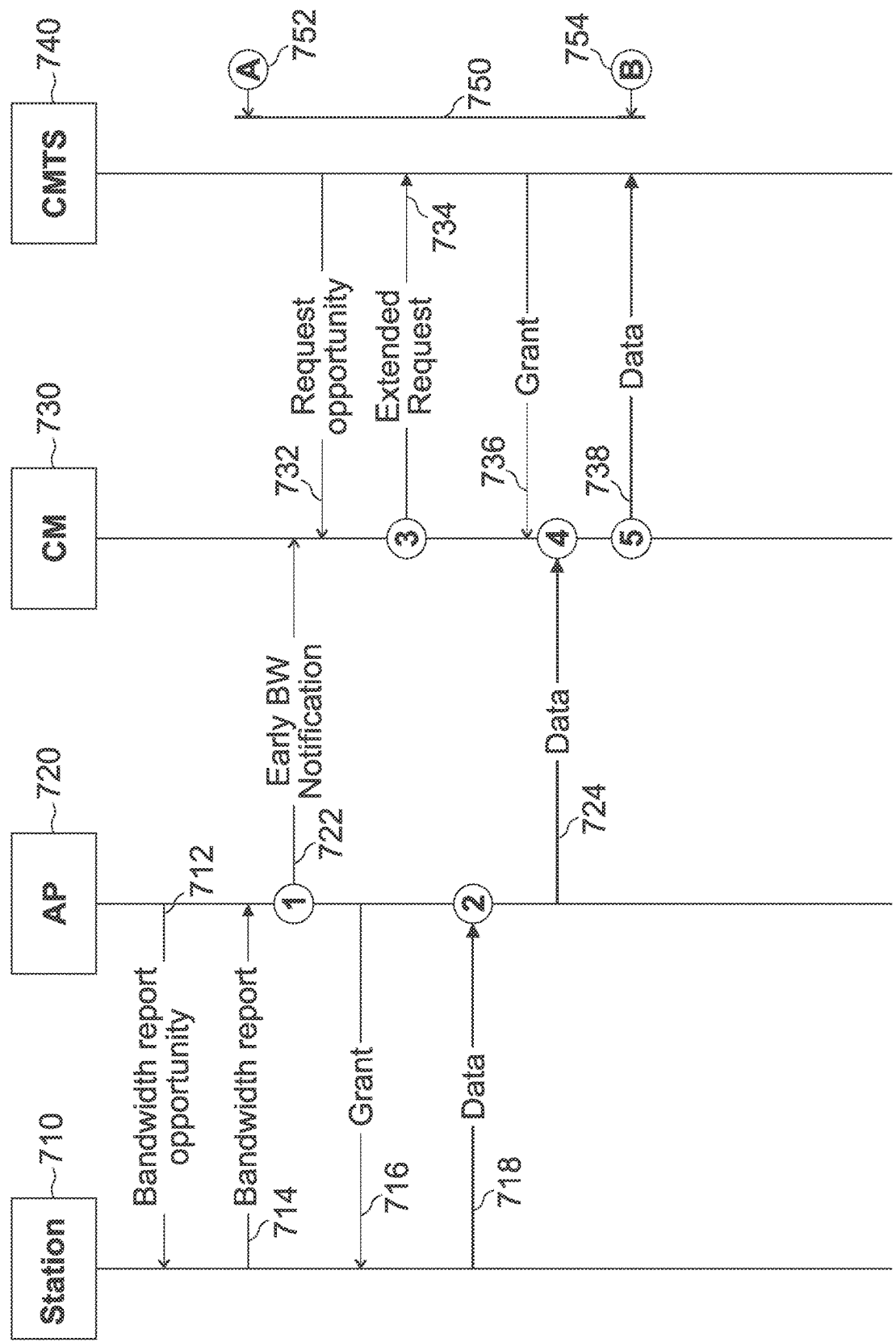
FIG. 7 illustrates an overview of a transmission flow with upstream synchronization.

FIG. 7 shows an example of a typical flow with synchronized schedulers: The AP 720 (e.g. the wireless network access device 100 comprising the apparatus 10) provides a bandwidth report opportunity 712 to the station 710 (e.g. the wireless communication device 200), which the station uses for a bandwidth report 714. At time 1, the AP scheduler 720 makes the decision to schedule (e.g. grant 716) a transmission (718) from the station 720 at time 2. It may immediately send the EBN message 722 to the CM 730 with the size, time (2) and QoS parameter for the transmission.

On the first opportunity (3) (based on a request opportunity 732), the CM 730 (e.g. the network gateway device 300) may send an EREQ 734 to the CMTS 740 (e.g. the network device 400), asking for a grant for a timeslot no earlier than time 4. Based on the CMTS constraints and on the Req_QoS_Priority value, the CMTS decides to schedule (e.g. grant 736) the timeslot to time 5 where the CM transmits 738 the data. The typical time 750 between A 752 and B 754 spots may be shortened significantly, thus enabling low latency services.

The following section offers an examples of pseudo-code of the mechanism:

AP Logic: After determining the time slot, notify the CM:

```
On_BW_Report(Station s, Size l, Priority p)
{
    Time t = Schedule(s, l); /* Allocate time for transmission */
    Send_EBN(t, l, p); */ Notify CM of time and size of station Tx */
}
    CM Logic: Set a future event to request builder to request
    for data ahead of time:
On_EBN(Time t, Size l, Priority p)
{
    /* Prepare EREQ to be sent to CMTS on first opportunity */
    Set_EREQ_Pending(now( )+t+PROPOGATION_TIME, l, p);
}
```

PROPOGATION_TIME may be the time between the AP receiving the data and the time it reaches the cable modem transmission queues. In FIG. 7 this is shown as the time between 2 and 4.

In some examples, the EREQ may be delayed/reduced due to cable modem rate limit enforcements. It may be up to the network manager to allocate enough bandwidth for real low latency services through standard DOCSIS mechanisms. Furthermore, the actual data received at the CM from the AP may be smaller than the size reported by the AP due to fragmentation and frame loss. This may lead to waste of bandwidth on the cable access network. As in many other bandwidth/latency tradeoff techniques, this may be a small sacrifice that may be made to reduce latency.

Figure 8:
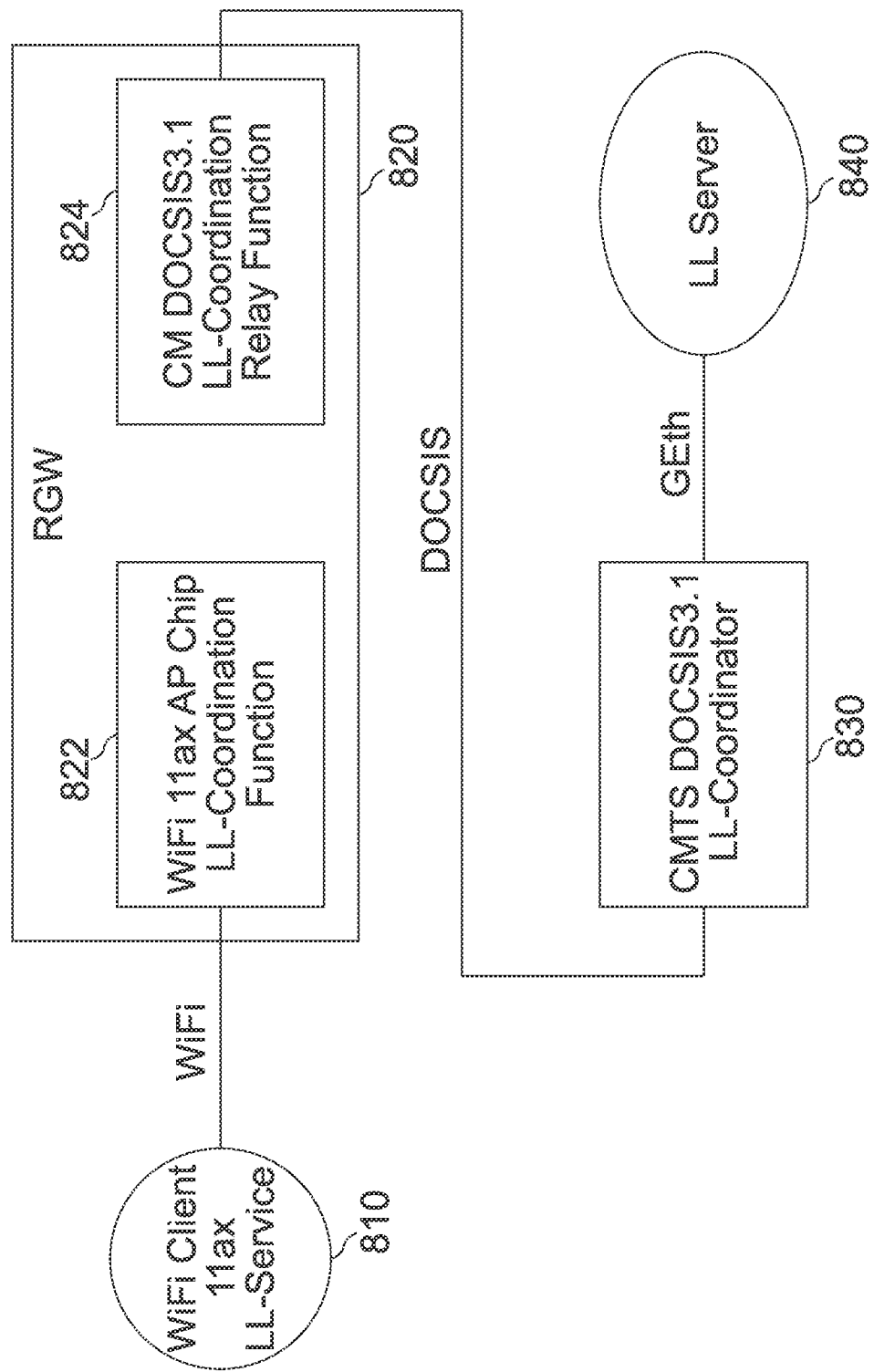
FIG. 8 illustrates an example, in which the wireless access point is integrated in the remote gateway.

Low Latency Communication Coordination Principles:
  TSN (Time Sensitive Networking): Measure transmission delay between WiFi AP Chip and CMTS
    WiFi AP Chip integrated in the RGW (Remote Gateway)
    WiFi AP Chip in Range Extender
  UL (Uplink) and DL (Downlink) traffic timing sync for Internet-bound traffic for Clients with LL (Low Latency)-Service
    WiFi AP chip requests DL and UL grants using LL-Coordination function
    CM relays requests from AP to CMTS using LL-Coordination Relay function
    CMTS responds with expected UL and DL grant schedule
    CMTS prioritizes DL traffic for Clients that have requested LL-Service
    CMTS issues UL grants for Clients that have requested LL-Service
  Client assigns internet-bound traffic that requires LL-Service to TID (Traffic ID) 5/7 and uses TID 0/2/4/6 for LAN traffic uses TID 1/3 for non-LL traffic FIG. 8 illustrates an example, in which the WiFi AP is integrated in the Remote Gateway (RGW). A WiFi client 810 (IEEE 802.11ax) (e.g. the apparatus 20 and/or the wireless communication device 200) using the LL-Service is connected via WiFi to a WiFi 11ax AP Chip 822 (e.g. the apparatus 10 and/or the wireless network access device 100) of the RGW 820 with a LL-Coordination Function. The CM 824 (DOCSIS 3.1) (e.g. the apparatus 30 and/or the network gateway device 300) with a LL-Coordination Relay function is connected to the CMTS (DOCSIS 3.1) LL-Coordinator 830 (e.g. the apparatus 40 and/or the network device 400) via DOCSIS. The CMTS LL-Coordinator 830 is connected to the LL Server 840 via Gigabit Ethernet (GEth).

Figure 9:
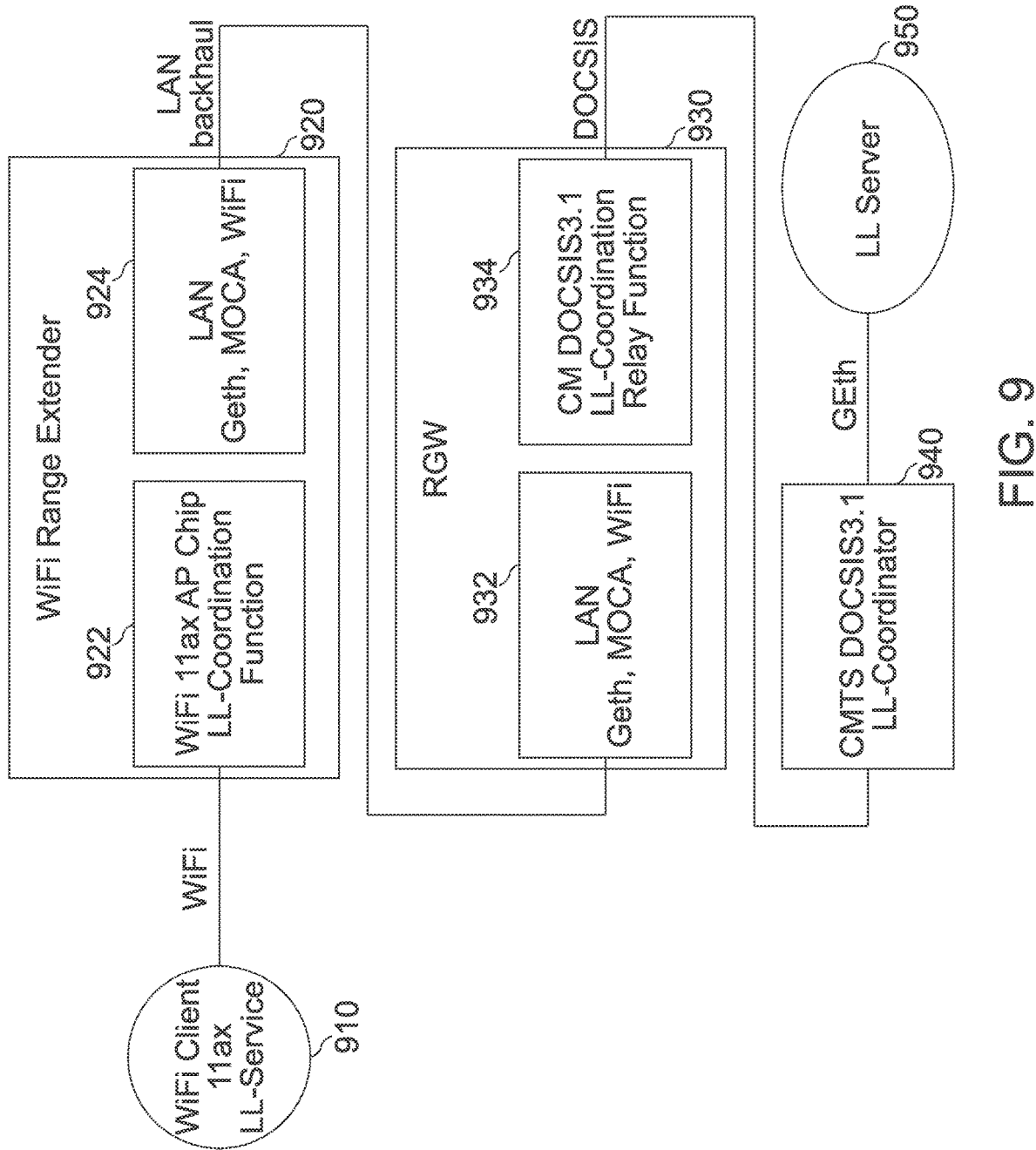
FIG. 9 illustrates an example, in which the wireless access point is integrated in a range extender.

FIG. 9 illustrates an example, in which the WiFi AP is integrated in a Range Extender. A WiFi client 910 (IEEE 802.11ax) (e.g. the apparatus 20 and/or the wireless communication device 200) using the LL-Service is connected via WiFi to a WiFi 11ax AP Chip 922 (e.g. the apparatus 10 and/or the wireless network access device 100) of the WiFi Range Extender 920 with a LL-Coordination Function. The WiFi Range Extender 920 comprises an interface 924 (e.g. LAN, GEth, MOCA (Multimedia over Coax Alliance), WiFi) for a LAN backhaul to an interface 932 (LAN, GEth, MOCA, WiFi) of the Remote Gateway 930. The Remote Gateway 930 further comprises a CM 934 (DOCSIS 3.1) (e.g. the apparatus 30 and/or the network gateway device 300) with a LL-Coordination Relay function connected to the CMTS (DOCSIS 3.1) LL-Coordinator 940 (e.g. the apparatus 40 and/or the network device 400) via DOCSIS. The CMTS LL-Coordinator 940 is connected to the LL Server 950 via Gigabit Ethernet (GEth).

According to an example, at the initialization of the low-latency service the WiFi AP coordination function (e.g. the apparatus 10 or the wireless network access device 100) may establish a common timebase of the WiFi AP chip to cable modem with the CM Coordination Relay (e.g. the apparatus 30 or the network gateway device 300) and the CMTS Coordinator (e.g. the network device 400). If a client with LL-Service (e.g. the wireless communication device 200) requests the low latency service (e.g. by transmitting the first request for wireless uplink resources), the client may fill the buffer status request (BSR) in data traffic with TID 5/7. The WiFi AP coordination function may monitor the BSR and request the uplink grant (e.g. the second request for wired uplink resources with parameters Client Destination Internet Protocol Address (DIP), Destination Port (DPORT), number of bytes, @Time[Period]. The CM Coordination Relay may convert the ReqULGrant (e.g. request uplink grant) into the DOCSIS protocol (e.g. for the third request for wired uplink resources) and send it to the CMTS Coordinator. The CMTS Coordinator may evaluate the request. The CMTS coordinator may respond with a reply comprising either an accept indicator with the number of bytes and a valid time, or a reject indicator. The CM coordination relay may convert the reply from DOCSIS to the coordination protocol and send it to the WiFi AP Coordination Function, which may update the UL/DL schedule. The WiFi AP Coordination Function may issue trigger frames to the Client to grant the uplink transmission operation as MU-MIMO (Multi-User Multiple Input Multiple Output) or OFDMA (Orthogonal Frequency-Division Multiple Access) UL. The CMTS Coordinator may grant the UL LL-Service for the Client.

If the client sends a UL data for a mix of LAN (Local Area Network) and WAN (Wide Area Network) as MU-MIMO or OFDMA UL, the WiFi AP Coordination Function may classify WAN-bound traffic (e.g. using the Traffic ID) and forward it to the CM Coordination Relay, which may convert it into the DOCSIS format and forward it to the CMTS as LL-Service upto grant. The CMTS Coordinator may forward the uplink traffic to the LL-service.

In terms of Flow Control, the Client may understand back pressure and may apply back pressure. If the WiFi AP Coordination Function is under-granted and the BSR grows (e.g. the buffer state of the wireless communication device 100), the WiFi AP Coordination Function may apply Client backpressure. The CM Coordination Relay may update the AP on the number of grants received for the LL-Service (Client) and apply backpressure.

Using a reactive backpressure strategy, no special treatment may be required at the client. At the access point, in case of backpressure, LL-Service traffic may be reclassified to non-LL traffic.

Using an active backpressure strategy, the client may notify apps generating traffic to reduce a data rate. No special treatment may be required at the access point.

In both cases, the cable modem may use a grant waterfall to reclassify non-confirming UL traffic for LL-Service as non-LL traffic.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The aspects and features mentioned and described together with one or more of the previously detailed examples and figures, may as well be combined with one or more of the other examples in order to replace a like feature of the other example or in order to additionally introduce the feature to the other example.

Example 1 relates to an apparatus 10 for a wireless network access device 100. The apparatus 10 comprises a first communication interface 12 for wirelessly communicating with a wireless communication device 200. The apparatus 10 further comprises a second communication interface 14 for communicating with a network gateway device 300. The apparatus 10 further comprises a control module 16 configured to receive a first request for wireless uplink resources from the wireless communication device 200 via the first communication interface 12. The control module 16 is configured to provide a second request for wired uplink resources to the network gateway device 300 via the second communication interface 14 based on the first request for wireless uplink resources. The second request for wired uplink resources is related to uplink resources of a wired uplink channel of the network gateway device 300.

Example 2 may include the subject matter of example 1, wherein the control module 16 is further configured to receive uplink data related to the first request for wireless uplink resources from the wireless communication device 200, and to forward the uplink data to the network gateway device 300.

Example 3 may include the subject matter of example 2, wherein the control module 16 is configured to provide the second request for wired uplink resources to the network gateway device 300 before receiving the uplink data.

Example 4 may include the subject matter of one of the examples 2 and 3, wherein the first request for wireless uplink resources comprises information related to an estimated size of the uplink data, and wherein the control module 16 is configured to provide the second request for wired uplink resources based on the information related to the estimated size of the uplink data.

Example 5 may include the subject matter of one of the previous examples, wherein the control module 16 is configured to provide information related to a grant of the requested wireless uplink resources to the wireless communication device 200.

Example 6 may include the subject matter of example 5, wherein the control module 16 is configured to provide the second request for wired uplink resources to the network gateway device 300 before providing the information related to the grant of the requested wireless uplink resources to the wireless communication device 200.

Example 7 may include the subject matter of one of the examples 5 or 6, wherein the information related to the grant of the requested wireless uplink resources comprises first timing information related to a granted time resource on the wireless uplink, and wherein the second request for wired uplink resources comprises second timing information related to a desired time resource of the requested wired uplink resources, wherein the control module 16 is configured to coordinate the first timing information and the second timing information.

Example 8 may include the subject matter of example 7, wherein the control module 16 is configured to determine the second timing information related to the desired time resource based on the information related to the granted time resource on the wireless uplink.

Example 9 may include the subject matter of one of the examples 7 or 8, wherein the control module 16 is configured to determine the information related to the granted time resource on the wireless uplink based on an estimated delay caused by the second request for wired uplink resources.

Example 10 may include the subject matter of one of the previous examples, wherein the first request for wireless uplink resources comprises information related to a buffer state at the wireless communication device 200, wherein the control module 16 is configured to provide the second request for wired uplink resources to the network gateway device 300 based on the information related to the buffer state at the wireless communication device 200.

Example 11 may include the subject matter of example 10, wherein the control module 16 is configured to receive information related to granted requests for wired uplink resources of the wired uplink channel from the network gateway device 300, wherein the control module 16 is configured to detect a mismatch between the information related to the granted requests for wired uplink resources of the wired uplink channel and the information related to the buffer state at the wireless communication device, and wherein the control module 16 is configured to provide data flow information to the wireless communication device 200 if a mismatch between the information related to the granted requests for wired uplink resources of the wired uplink channel and the information related to the buffer state at the wireless communication device is detected.

Example 12 may include the subject matter of one of the previous examples, wherein the first request for wireless uplink resources comprises information related to a desired quality of service for a transmission of uplink data via the wired uplink channel of the network gateway device 300, wherein the control module 16 is configured to translate the information related to a desired quality of service for the second request for wired uplink resources.

Example 13 may include the subject matter of one of the previous examples, wherein the first communication interface 12 is configured to wirelessly communicate with the wireless communication device 200 using a wireless communication channel, wherein the first request for wireless uplink resources is received as control information on a data link layer of the wireless communication channel.

Example 14 may include the subject matter of one of the previous examples, wherein the wired uplink channel is based on a Data Over Cable Service Interface Specification. Additionally or alternatively, the first communication interface 12 may be configured to wirelessly communicate with the wireless communication device 200 using a Wireless Local Area Network.

Example 15 relates to an apparatus 30 for a network gateway device 300. The apparatus 30 comprises a first communication interface 32 for communicating with a network device 400 of a remote network using a wired uplink channel and a wired downlink channel. The apparatus 30 further comprises a second communication interface 34 for communicating with a wireless network access device 100. The apparatus 30 further comprises a control module 36 configured to receive a second request for wired uplink resources from the wireless network access device 100 via the second communication interface 34. The second request for wired uplink resources is related to uplink resources of the wired uplink channel. The control module 34 is configured to provide a third request for wired uplink resources on the wired uplink channel to the network device 400 based on the second request for wired uplink resources via the first communication interface 32.

Example 16 may include the subject matter of example 15, wherein the control module 36 is configured to receive uplink data related to the second request for wired uplink resources from the wireless network access device 100 and to forward the uplink data to the network device 400 via the wired uplink channel.

Example 17 may include the subject matter of one of the examples 15 or 16, wherein the control module 36 is configured to provide information related to granted requests for wired uplink resources to the wireless network access device 100 based on previously received requests for wired uplink resources of the wired uplink channel.

Example 18 may include the subject matter of one of the examples 15 to 17, wherein the second request for wired uplink resources comprises information related to a desired quality of service for the transmission of uplink data via the wired uplink channel, wherein the control module 30 is configured to provide the third request for wired uplink resources based on the information related to the desired quality of service.

Example 19 may include the subject matter of one of the examples 15 to 18, wherein the second request for wired uplink resources comprises information related to a desired time resource for the requested wired uplink resources, wherein the control module 36 is configured to provide the third request for wired uplink resources based on the information related to the desired time resource.

Examples 20 relates to an apparatus 20 for a wireless communication device 200. The apparatus 20 comprises a wireless communication interface 22 for wirelessly communicating with a wireless network access device 100. The apparatus 20 further comprises a control module 24 configured to transmit a first request for wireless uplink resources to the wireless network access device 100 via the wireless communication interface 12. The first request for wireless uplink resources is associated with uplink data to be transmitted via the wireless network access device 100 and via a wired uplink channel of a network gateway device 300. The first request for wireless uplink resources comprises information related to a desired quality of service for the transmission of the uplink data via the wired uplink channel of the network gateway device 300.

Example 21 may include the subject matter of example 20, wherein the control module 24 is configured to receive information related to a grant of the requested wireless uplink resources from the wireless network access device 100 via the wireless communication interface 22, wherein the control module 26 is further configured to transmit the uplink data associated with the first request for wireless uplink resources based on the information related to the grant of the requested wireless uplink resources.

Example 22 may include the subject matter of one of the examples 20 or 21, wherein the wireless communication interface 22 is configured to wirelessly communicate with the wireless network access device 100 using a wireless communication channel, wherein the first request for wireless uplink resources is transmitted as control information on a data link layer of the wireless communication channel.

Example 23 may include the subject matter of one of the examples 20 to 22, wherein the first request for wireless uplink resources comprises information related to a buffer state at the wireless communication device, and/or wherein the first request for wireless uplink resources comprises information related to an estimated size of the uplink data to be transmitted.

Example 24 may include the subject matter of example 23, wherein the control module 24 is configured to receive data flow information from the wireless network access device 100 via the wireless communication interface 22 in response to the information related to the buffer state or in response to the information related to the estimated size of the uplink data to be transmitted, wherein the control module 24 is configured to alter the uplink data to be transmitted to adapt the uplink data to be transmitted to the data flow information.

Example 25 relates to an apparatus 40 for a network device 400. The apparatus 40 comprises a communication interface 42 for communicating with a network gateway device 300 using a wired uplink channel and a wired downlink channel. The wired uplink channel is suitable for transmitting data from the network gateway device 300 to the network device 400 and wherein the wired downlink channel is suitable for transmitting data from the network device 400 to the network gateway device 300. The apparatus 40 further comprises a control module 44 configured to receive a (third) request for wired uplink resources on the wired uplink channel via the communication interface 42.

The request for wired uplink resources on the wired uplink channel comprises information related to a desired time resource for the requested wired uplink resources. The control module 44 is configured to grant the request for the wired uplink resources of the wired uplink channel based on the information related to the desired time resource via the communication interface 42.

Example 26 may include the subject matter of example 25, wherein the request for wired uplink resources of the wired uplink channel comprises information related to a desired quality of service for a transmission of uplink data via the wired uplink channel, wherein the control module 44 is configured to grant the request for wired uplink resources on the wired uplink channel based on the information related to the desired quality of service for the transmission of uplink data via the wired uplink channel.

Example 27 may include the subject matter of one of the examples 25 or 26, wherein the request for wired uplink resources of the wired uplink channel comprises information related to an estimated size of uplink data to be transmitted, wherein the control module 44 is configured to grant the request for wired uplink resources on the wired uplink channel based on the information related to the estimated size of uplink data to be transmitted.

Example 28 relates to a wireless network access device 100 comprising an apparatus 10 according to one of the examples 1 to 14.

Example 29 relates to a network gateway device 300 comprising an apparatus 10 according to one of the examples 15 to 19.

Example 30 relates to a wireless communication device 200 comprising an apparatus 20 according to one of the examples 20 to 24.

Example 31 relates to a mobile device 200 comprising an apparatus 20 according to one of the examples 20 to 24.

Example 32 relates to a network device 400 comprising an apparatus 40 according to one of the examples 25 to 27.

Example 33 relates to a device 10 for a wireless network access device 100. The device 10 comprises a first means for communicating 12 for wirelessly communicating with a wireless communication device 200. The device 10 further comprises a second means for communicating 14 for communicating with a network gateway device 300. The device 10 further comprises a means for controlling 16 configured for receiving a first request for wireless uplink resources from the wireless communication device 200 via the first means for communicating 12. The means for controlling is further configured for providing a second request for wired uplink resources to the network gateway device 300 via the second means for communicating 14 based on the first request for wireless uplink resources. The second request for wired uplink resources is related to uplink resources of a wired uplink channel of the network gateway device 300.

Example 34 may include the subject matter of example 33, wherein the means for controlling 16 is further configured for receiving uplink data related to the first request for wireless uplink resources from the wireless communication device 200, and to forward the uplink data to the network gateway device 300.

Example 35 may include the subject matter of example 34, wherein the means for controlling 16 is configured for providing the second request for wired uplink resources to the network gateway device 300 before receiving the uplink data.

Example 36 may include the subject matter of one of the examples 34 or 35, wherein the first request for wireless uplink resources comprises information related to an estimated size of the uplink data, and wherein the means for controlling 16 is configured for providing the second request for wired uplink resources based on the information related to the estimated size of the uplink data.

Example 37 may include the subject matter of one of the examples 33 to 36, wherein the means for controlling 16 is configured for providing information related to a grant of the requested wireless uplink resources to the wireless communication device 200.

Example 38 may include the subject matter of example 37, wherein the means for controlling 16 is configured for providing the second request for wired uplink resources to the network gateway device 300 before providing the information related to the grant of the requested wireless uplink resources to the wireless communication device 200.

Example 39 may include the subject matter of one of the examples 37 or 38, wherein the information related to the grant of the requested wireless uplink resources comprises first timing information related to a granted time resource on the wireless uplink, and wherein the second request for wired uplink resources comprises second timing information related to a desired time resource of the requested wired uplink resources, wherein the means for controlling 16 is configured for coordinating the first timing information and the second timing information.

Example 40 may include the subject matter of example 39, wherein the means for controlling 16 is configured for determining the second timing information related to the desired time resource based on the information related to the granted time resource on the wireless uplink.

Example 41 may include the subject matter of one of the examples 39 or 40, wherein the means for controlling 16 is configured for determining the information related to the granted time resource on the wireless uplink based on an estimated delay caused by the second request for wired uplink resources.

Example 42 may include the subject matter of one of the examples 33 to 41, wherein the first request for wireless uplink resources comprises information related to a buffer state at the wireless communication device 200, wherein the means for controlling 16 is configured for providing the second request for wired uplink resources to the network gateway device 300 based on the information related to the buffer state at the wireless communication device 200.

Example 43 may include the subject matter of example 42, wherein the means for controlling 16 is configured for receiving information related to granted requests for wired uplink resources of the wired uplink channel from the network gateway device 300, wherein the means for controlling 16 is configured for detecting a mismatch between the information related to the granted requests for wired uplink resources of the wired uplink channel and the information related to the buffer state at the wireless communication device, and wherein the means for controlling 16 is configured for providing data flow information to the wireless communication device 200 if a mismatch between the information related to the granted requests for wired uplink resources of the wired uplink channel and the information related to the buffer state at the wireless communication device is detected.

Example 44 may include the subject matter of one of the examples 33 to 43, wherein the first request for wireless uplink resources comprises information related to a desired quality of service for a transmission of uplink data via the wired uplink channel of the network gateway device 300, wherein the means for controlling 16 is configured for translating the information related to a desired quality of service for the second request for wired uplink resources.

Example 45 may include the subject matter of one of the examples 33 to 44, wherein the first means for communicating 12 is configured for wirelessly communicating with the wireless communication device 200 using a wireless communication channel, wherein the first request for wireless uplink resources is received as control information on a data link layer of the wireless communication channel.

Example 46 may include the subject matter of one of the examples 33 to 45, wherein the wired uplink channel is based on a Data Over Cable Service Interface Specification. Additionally or alternatively, the first means for communicating 12 is configured for wirelessly communicating with the wireless communication device 200 using a Wireless Local Area Network.

Example 47 relates to a device 30 for a network gateway device 300. The device 30 comprises a first means for communicating 32 for communicating with a network device 400 of a remote network using a wired uplink channel and a wired downlink channel. The device 30 comprises a second means for communicating 34 for communicating with a wireless network access device 100. The device 30 comprises a means for controlling 36 configured for receiving a second request for wired uplink resources from the wireless network access device 100 via the second means for communicating 34. The second request for wired uplink resources is related to uplink resources of the wired uplink channel. The means for controlling 36 is configured for providing a third request for wired uplink resources on the wired uplink channel to the network device 400 based on the second request for wired uplink resources via the first means for communicating 32.

Example 48 may include the subject matter of example 47, wherein the means for controlling 36 is configured for receiving uplink data related to the second request for wired uplink resources from the wireless network access device 100 and for forwarding the uplink data to the network device 400 via the wired uplink channel.

Example 49 may include the subject matter of one of the examples 47 or 48, wherein the means for controlling 36 is configured for providing information related to granted requests for wired uplink resources to the wireless network access device 100 based on previously received requests for wired uplink resources of the wired uplink channel.

Example 50 may include the subject matter of one of the examples 47 to 49, wherein the second request for wired uplink resources comprises information related to a desired quality of service for the transmission of uplink data via the wired uplink channel, wherein the means for controlling 30 is configured for providing the third request for wired uplink resources based on the information related to the desired quality of service.

Example 51 may include the subject matter of one of the examples 47 to 50, wherein the second request for wired uplink resources comprises information related to a desired time resource for the requested wired uplink resources, wherein the means for controlling 36 is configured for providing the third request for wired uplink resources based on the information related to the desired time resource.

Example 52 relates to a device 20 for a wireless communication device 200. The device 20 comprises a means for communicating wirelessly 22 for wirelessly communicating with a wireless network access device 100. The device 20 further comprises a means for controlling 24 configured for transmitting a first request for wireless uplink resources to the wireless network access device 100 via the means for communicating wirelessly 12. The first request for wireless uplink resources is associated with uplink data to be transmitted via the wireless network access device 100 and via a wired uplink channel of a network gateway device 300. The first request for wireless uplink resources comprises information related to a desired quality of service for the transmission of the uplink data via the wired uplink channel of the network gateway device 300.

Example 53 may include the subject matter of example 52, wherein the means for controlling 24 is configured for receiving information related to a grant of the requested wireless uplink resources from the wireless network access device 100 via the means for communicating wirelessly 22, wherein the means for controlling 26 is further configured for transmitting the uplink data associated with the first request for wireless uplink resources based on the information related to the grant of the requested wireless uplink resources.

Example 54 may include the subject matter of one of the examples 52 or 53, wherein the means for communicating wirelessly 22 is configured for wirelessly communicating with the wireless network access device 100 using a wireless communication channel, wherein the first request for wireless uplink resources is transmitted as control information on a data link layer of the wireless communication channel.

Example 55 may include the subject matter of one of the examples 52 to 54, wherein the first request for wireless uplink resources comprises information related to a buffer state at the wireless communication device, and/or wherein the first request for wireless uplink resources comprises information related to an estimated size of the uplink data to be transmitted.

Example 56 may include the subject matter of example 55, wherein the means for controlling 24 is configured for receiving data flow information from the wireless network access device 100 via the means for communicating wirelessly 22 in response to the information related to the buffer state or in response to the information related to the estimated size of the uplink data to be transmitted, wherein the means for controlling 24 is configured for altering the uplink data to be transmitted to adapt the uplink data to be transmitted to the data flow information.

Example 57 relates to a device 40 for a network device 400. The device 40 comprises a means for communicating 42 for communicating with a network gateway device 300 using a wired uplink channel and a wired downlink channel. The wired uplink channel is suitable for transmitting data from the network gateway device 300 to the network device 400 and wherein the wired downlink channel is suitable for transmitting data from the network device 400 to the network gateway device 300. The device 40 comprises a means for controlling 44 configured for receiving a request for wired uplink resources on the wired uplink channel via the means for communicating 42. The request for wired uplink resources on the wired uplink channel comprises information related to a desired time resource for the requested wired uplink resources. The means for controlling 44 is configured for granting the request for the wired uplink resources of the wired uplink channel based on the information related to the desired time resource via the means for communicating 42.

Example 58 may include the subject matter of example 57, wherein the request for wired uplink resources of the wired uplink channel comprises information related to a desired quality of service for a transmission of uplink data via the wired uplink channel, wherein the means for controlling 44 is configured for granting the request for wired uplink resources on the wired uplink channel based on the information related to the desired quality of service for the transmission of uplink data via the wired uplink channel.

Example 59 may include the subject matter of one of the examples 57 or 58, wherein the request for wired uplink resources of the wired uplink channel comprises information related to an estimated size of uplink data to be transmitted, wherein the means for controlling 44 is configured for granting the request for wired uplink resources on the wired uplink channel based on the information related to the estimated size of uplink data to be transmitted.

Example 60 relates to a wireless network access device 100 comprising a device 10 according to one of the examples 33 to 46.

Example 61 relates to a network gateway device 300 comprising a device 30 according to one of the examples 47 to 51.

Example 62 relates to a wireless communication device 200 comprising a device 20 according to one of the examples 52 to 56.

Example 63 relates to a mobile device 200 comprising a device 20 according to one of the examples 52 to 56.

Example 64 relates to a network device 400 comprising a device 40 according to one of the examples 57 to 59.

Example 65 relates to a method for a wireless network access device 100. The method comprises wirelessly communicating with a wireless communication device 200 using a first communication interface. The method further comprises communicating with a network gateway device 300 using a second communication interface. The method further comprises receiving a first request for wireless uplink resources from the wireless communication device 200. The method further comprises providing a second request for wired uplink resources to the network gateway device 300 based on the first request for wireless uplink resources. The second request for wired uplink resources is related to uplink resources of a wired uplink channel of the network gateway device 300.

Example 66 may include the subject matter of example 65, wherein the method further comprises receiving uplink data related to the first request for wireless uplink resources from the wireless communication device 200, and to forward the uplink data to the network gateway device 300.

Example 67 may include the subject matter of example 66, wherein the second request for wired uplink resources is provided to the network gateway device 300 before receiving the uplink data.

Example 68 may include the subject matter of example 66, wherein the first request for wireless uplink resources comprises information related to an estimated size of the uplink data, and wherein the second request for wired uplink resources is provided based on the information related to the estimated size of the uplink data.

Example 69 may include the subject matter of one of the examples 65 to 68, wherein the method further comprises providing information related to a grant of the requested wireless uplink resources to the wireless communication device 200.

Example 70 may include the subject matter of example 69, wherein the second request for wired uplink resources is provided to the network gateway device 300 before providing the information related to the grant of the requested wireless uplink resources to the wireless communication device 200.

Example 71 may include the subject matter of one of the examples 69 or 70, wherein the information related to the grant of the requested wireless uplink resources comprises first timing information related to a granted time resource on the wireless uplink, and wherein the second request for wired uplink resources comprises second timing information related to a desired time resource of the requested wired uplink resources, wherein the method further comprises coordinating the first timing information and the second timing information.

Example 72 may include the subject matter of example 71, wherein the method further comprises determining the second timing information related to the desired time resource based on the information related to the granted time resource on the wireless uplink.

Example 73 may include the subject matter of one of the examples 71 or 72, wherein the information related to the granted time resource on the wireless uplink is determined based on an estimated delay caused by the second request for wired uplink resources.

Example 74 may include the subject matter of one of the examples 65 to 73, wherein the first request for wireless uplink resources comprises information related to a buffer state at the wireless communication device 200, wherein the second request for wired uplink resources is provided to the network gateway device 300 based on the information related to the buffer state at the wireless communication device 200.

Example 75 may include the subject matter of example 74, wherein the method comprises receiving information related to granted requests for wired uplink resources of the wired uplink channel from the network gateway device 300, wherein the method comprises detecting a mismatch between the information related to the granted requests for wired uplink resources of the wired uplink channel and the information related to the buffer state at the wireless communication device, and wherein the method comprises providing data flow information to the wireless communication device 200 if a mismatch between the information related to the granted requests for wired uplink resources of the wired uplink channel and the information related to the buffer state at the wireless communication device is detected.

Example 76 may include the subject matter of one of the examples 65 to 75, wherein the first request for wireless uplink resources comprises information related to a desired quality of service for a transmission of uplink data via the wired uplink channel of the network gateway device 300, wherein the method further comprises translating the information related to a desired quality of service for the second request for wired uplink resources.

Example 77 may include the subject matter of one of the examples 65 to 76, wherein the first means for communicating is configured for wirelessly communicating with the wireless communication device 200 using a wireless communication channel, wherein the first request for wireless uplink resources is received as control information on a data link layer of the wireless communication channel.

Example 78 may include the subject matter of one of the examples 65 to 77, wherein the wired uplink channel is based on a Data Over Cable Service Interface Specification. Additionally or alternatively, the first means for communicating may be configured for wirelessly communicating with the wireless communication device 200 using a Wireless Local Area Network.

Example 79 relates to a method for a network gateway device 300. The method comprises communicating with a network device 400 of a remote network using a wired uplink channel and a wired downlink channel using a first communication interface. The method further comprises communicating with a wireless network access device 100 using a second communication interface. The method further comprises receiving a second request for wired uplink resources from the wireless network access device 100 via the second communication interface 34. The second request for wired uplink resources is related to uplink resources of the wired uplink channel. The method further comprises providing a third request for wired uplink resources on the wired uplink channel to the network device 400 based on the second request for wired uplink resources.

Example 80 may include the subject matter of example 79, wherein the method further comprises receiving uplink data related to the second request for wired uplink resources from the wireless network access device 100 and forwarding the uplink data to the network device 400 via the wired uplink channel.

Example 81 may include the subject matter of one of the examples 79 or 80, wherein the method comprises providing information related to granted requests for wired uplink resources to the wireless network access device 100 based on previously received requests for wired uplink resources of the wired uplink channel.

Example 82 may include the subject matter of one of the examples 79 to 81, wherein the second request for wired uplink resources comprises information related to a desired quality of service for the transmission of uplink data via the wired uplink channel, wherein the means for controlling is configured for providing the third request for wired uplink resources based on the information related to the desired quality of service.

Example 83 may include the subject matter of one of the examples 72 to 82, wherein the second request for wired uplink resources comprises information related to a desired time resource for the requested wired uplink resources, wherein the third request for wired uplink resources is provided based on the information related to the desired time resource.

Example 84 relates to a method for a wireless communication device 200. The method comprises wirelessly communicating with a wireless network access device 100 using a wireless communication interface. The method further comprises transmitting a first request for wireless uplink resources to the wireless network access device 100. The first request for wireless uplink resources is associated with uplink data to be transmitted via the wireless network access device 100 and via a wired uplink channel of a network gateway device 300. The first request for wireless uplink resources comprises information related to a desired quality of service for the transmission of the uplink data via the wired uplink channel of the network gateway device 300.

Example 85 may include the subject matter of example 84, wherein the method comprises receiving information related to a grant of the requested wireless uplink resources from the wireless network access device 100, wherein the uplink data associated with the first request for wireless uplink resources is transmitted based on the information related to the grant of the requested wireless uplink resources.

Example 86 may include the subject matter of one of the examples 84 or 85, wherein the wireless communication interface is configured for wirelessly communicating with the wireless network access device 100 using a wireless communication channel, wherein the first request for wireless uplink resources is transmitted as control information on a data link layer of the wireless communication channel.

Example 87 may include the subject matter of one of the examples 84 to 86, wherein the first request for wireless uplink resources comprises information related to a buffer state at the wireless communication device, and/or wherein the first request for wireless uplink resources comprises information related to an estimated size of the uplink data to be transmitted.

Example 88 may include the subject matter of example 87, wherein the method comprises receiving data flow information from the wireless network access device 100 in response to the information related to the buffer state or in response to the information related to the estimated size of the uplink data to be transmitted, wherein method comprises altering the uplink data to be transmitted to adapt the uplink data to be transmitted to the data flow information.

Example 89 relates to a method for a network device 400. The method comprises communicating with a network gateway device 300 using a wired uplink channel and a wired downlink channel. The wired uplink channel is suitable for transmitting data from the network gateway device 300 to the network device 400 and wherein the wired downlink channel is suitable for transmitting data from the network device 400 to the network gateway device 300. The method further comprises receiving a request for wired uplink resources on the wired uplink channel, wherein the request for wired uplink resources on the wired uplink channel comprises information related to a desired time resource for the requested wired uplink resources. The method further comprises granting the request for the wired uplink resources of the wired uplink channel based on the information related to the desired time resource.

Example 90 may include the subject matter of example 89, wherein the request for wired uplink resources of the wired uplink channel comprises information related to a desired quality of service for a transmission of uplink data via the wired uplink channel, wherein the request for wired uplink resources on the wired uplink channel is granted based on the information related to the desired quality of service for the transmission of uplink data via the wired uplink channel.

Example 91 may include the subject matter of one of the examples 89 or 90, wherein the request for wired uplink resources of the wired uplink channel comprises information related to an estimated size of uplink data to be transmitted, wherein the request for wired uplink resources on the wired uplink channel is granted based on the information related to the estimated size of uplink data to be transmitted.

Example 92 relates to a machine readable storage medium including program code, when executed, to cause a machine to perform the method of one of the examples 65 to 91.

Example 93 relates to a computer program having a program code for performing the method of at least one of the examples 65 to 91, when the computer program is executed on a computer, a processor, or a programmable hardware component.

Example 94 relates to a machine readable storage including machine readable instructions, when executed, to implement a method or realize an apparatus as claimed in any pending claim.

Example 95 relates to a system comprising the wireless network access device 100 according to example 28 and the network gateway device 300 according to example 29.

Example 96 may include the subject matter of example 95, wherein the system further comprises the network device 400 according to example 32.

Example 97 may include the subject matter of one of the examples 95 or 96, wherein the system further comprises the wireless communication device 200 according to example 30.

Example 98 relates to a system comprising the wireless network access device 100 according to example 60 and the network gateway device 300 according to example 61.

Example 99 may include the subject matter of example 98, wherein the system further comprises the network device 400 according to example 64.

Example 100 may include the subject matter of one of the examples 98 or 99, wherein the system further comprises the wireless communication device 200 according to example 62.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for a wireless network access device, the apparatus comprising:
    a first communication interface for wirelessly communicating with a wireless communication device;
    a second communication interface for communicating with a network gateway device; and
    a control module configured to:
        receive a first request for wireless uplink resources from the wireless communication device via the first communication interface, and
        provide a second request for wired uplink resources to the network gateway device via the second communication interface based on the first request for wireless uplink resources,
        wherein the second request for wired uplink resources is related to uplink resources of a wired uplink channel of the network gateway device,
        determine a first timing information related to a time resource on the wireless uplink,
            wherein the first timing information is based on an estimated delay between the second request for wired uplink resources and a response to the second request for wired uplink resources, and
        provide a grant of the requested wireless uplink resources to the wireless communication device based on the first request for wireless uplink resources,
        wherein the grant of the requested wireless uplink resources comprises the first timing information related to the time resource on the wireless uplink; and
        wherein the grant is provided before the response to the second request for wired uplink resources is received from the network gateway device.

2. The apparatus according to claim 1, wherein the control module is further configured to receive uplink data related to the first request for wireless uplink resources from the wireless communication device, and to forward the uplink data to the network gateway device.

3. The apparatus according to claim 2, wherein the control module is configured to provide the second request for wired uplink resources to the network gateway device before receiving the uplink data.

4. The apparatus according to claim 2, wherein the first request for wireless uplink resources comprises an estimated size of the uplink data, and wherein the control module is configured to provide the second request for wired uplink resources based on the estimated size of the uplink data.

5. The apparatus according to claim 1, wherein the control module is configured to provide the second request for wired uplink resources to the network gateway device before providing the grant of the requested wireless uplink resources to the wireless communication device.

6. The apparatus according to claim 1, wherein the second request for wired uplink resources comprises second timing information related to a desired time resource of the requested wired uplink resources, wherein the control module is configured to coordinate the first timing information and the second timing information.

7. The apparatus according to claim 6, wherein the control module is configured to determine the second timing information related to the desired time resource based on the first timing information related to the time resource on the wireless uplink.

8. The apparatus according to claim 1, wherein the first request for wireless uplink resources comprises information related to a buffer state at the wireless communication device, wherein the control module is configured to provide the second request for wired uplink resources to the network gateway device based on the information related to the buffer state at the wireless communication device.

9. The apparatus according to claim 8, wherein the control module is configured to receive information related to granted requests for wired uplink resources of the wired uplink channel from the network gateway device, wherein the control module is configured to detect a mismatch between the information related to the granted requests for wired uplink resources of the wired uplink channel and the information related to the buffer state at the wireless communication device, and wherein the control module is configured to provide data flow information to the wireless communication device if a mismatch between the information related to the granted requests for wired uplink resources of the wired uplink channel and the information related to the buffer state at the wireless communication device is detected.

10. The apparatus according to claim 1, wherein the first request for wireless uplink resources comprises information related to a desired quality of service for a transmission of uplink data via the wired uplink channel of the network gateway device, wherein the control module is configured to translate the information related to a desired quality of service for the second request for wired uplink resources.

11. The apparatus according to claim 1, wherein the first communication interface is configured to wirelessly communicate with the wireless communication device using a wireless communication channel, wherein the first request for wireless uplink resources is received as control information on a data link layer of the wireless communication channel.

12. A method for a wireless network access device, the method comprising:
wirelessly communicating with a wireless communication device using a first communication interface;
communicating with a network gateway device using a second communication interface;
receiving a first request for wireless uplink resources from the wireless communication device;
providing a second request for wired uplink resources to the network gateway device based on the first request for wireless uplink resources,
wherein the second request for wired uplink resources is related to uplink resources of a wired uplink channel of the network gateway device;
determining a first timing information related to a time resource on the wireless uplink,
wherein the first timing information is based on an estimated delay between the second request for wired uplink resources and a response to the second request for wired uplink resources; and
providing a grant of the requested wireless uplink resources to the wireless communication device based on the first request for wireless uplink resources,
wherein the grant of the requested wireless uplink resources comprises the first timing information related to the time resource on the wireless uplink, and
wherein the grant is provided before the response to the second request for wired uplink resources is received from the network gateway device.

13. The method of claim 12 further comprising receiving uplink data related to the first request for wireless uplink resources from the wireless communication device and forwarding the uplink data to the network gateway device,
wherein the first request for wireless uplink resources comprises information related to an estimated size of the uplink data,
wherein the second request for wired uplink resources is provided to the network gateway device before receiving the uplink data, and
wherein the second request for wired uplink resources is provided based on the information related to the estimated size of the uplink data.

14. The method of claim 12, wherein the second request for wired uplink resources is provided to the network gateway device before providing the grant of the requested wireless uplink resources to the wireless communication device.

15. The method of claim 12, wherein the second request for wired uplink resources comprises second timing information related to a desired time resource of the requested wired uplink resources, wherein the method further comprises coordinating the first timing information and the second timing information.

16. The method of claim 12, wherein the first request for wireless uplink resources comprises information related to a buffer state at the wireless communication device, wherein the second request for wired uplink resources is provided to the network gateway device based on the information related to the buffer state at the wireless communication device.

17. The method of claim 16, wherein the method comprises receiving information related to granted requests for wired uplink resources of the wired uplink channel from the network gateway device, wherein the method comprises detecting a mismatch between the information related to the granted requests for wired uplink resources of the wired uplink channel and the information related to the buffer state at the wireless communication device, and wherein the method comprises providing data flow information to the wireless communication device if a mismatch between the information related to the granted requests for wired uplink resources of the wired uplink channel and the information related to the buffer state at the wireless communication device is detected.

18. The method of claim 12, wherein the first request for wireless uplink resources comprises information related to a desired quality of service for a transmission of uplink data via the wired uplink channel of the network gateway device, wherein the method further comprises translating the information related to a desired quality of service for the second request for wired uplink resources.

19. The method of claim 12, wherein the first communication interface is configured for wirelessly communicating with the wireless communication device using a wireless communication channel, wherein the first request for wireless uplink resources is received as control information on a data link layer of the wireless communication channel.

* * * * *